United States Patent
Murray et al.

(10) Patent No.: US 12,167,448 B2
(45) Date of Patent: Dec. 10, 2024

(54) CHANNEL ACCESS WITH A NEW RADIO UNLICENSED SERVING CELL

(71) Applicant: InterDigital Patent Holdings, Inc., Wilmington, DE (US)

(72) Inventors: Joseph M. Murray, Schwenksville, PA (US); Pascal M. Adjakple, Great Neck, NY (US); Lakshmi R. Iyer, King of Prussia, PA (US); Mohamed Awadin, Plymouth Meeting, PA (US); Qing Li, Princeton Junction, NJ (US); Jan R. Johansson, Norrfjarden (SE); Stephen E. Terry, Northport, NY (US)

(73) Assignee: Interdigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/049,746

(22) PCT Filed: May 9, 2019

(86) PCT No.: PCT/US2019/031508
§ 371 (c)(1),
(2) Date: Oct. 22, 2020

(87) PCT Pub. No.: WO2019/217670
PCT Pub. Date: Nov. 14, 2019

(65) Prior Publication Data
US 2021/0289548 A1    Sep. 16, 2021

Related U.S. Application Data

(60) Provisional application No. 62/669,086, filed on May 9, 2018.

(51) Int. Cl.
*H04W 4/00* (2018.01)
*H04W 72/23* (2023.01)
(Continued)

(52) U.S. Cl.
CPC ....... *H04W 74/0808* (2013.01); *H04W 72/23* (2023.01); *H04W 74/006* (2013.01)

(58) Field of Classification Search
None
See application file for complete search history.

(56) References Cited

U.S. PATENT DOCUMENTS

| 10,841,914 | B2 * | 11/2020 | Liou | H04L 5/0094 |
| 11,751,240 | B2 * | 9/2023 | Kim | H04W 16/14 |
| | | | | 370/329 |

(Continued)

FOREIGN PATENT DOCUMENTS

| CN | 107624264 A | 1/2018 |
| JP | 2012-525723 A | 10/2012 |

(Continued)

OTHER PUBLICATIONS

LG Electronics, "Remaining issues on DCI contents and formats", R1-1719920, 3GPP TSG RAN WG1 Meeting 91, 2017, pp. 6.

(Continued)

*Primary Examiner* — Clemence S Han
(74) *Attorney, Agent, or Firm* — Julian F. Santos

(57) ABSTRACT

A radio device may receive network assistance information relating to uplink channel access procedures, such as channel access types and related listen-before-talk techniques, via layer one signaling or higher layer signaling. For example, information may be provided via DCI, MAC CE, or RRC messaging, e.g., received in a CORESET preceding the configured PRACH resources. Access procedures may be random access procedures, and may include indication via R.AR messaging. Access procedures may be triggered by a radio access point message, such as a PDCCH order or a handover request.

16 Claims, 27 Drawing Sheets

(51) Int. Cl.
*H04W 74/00* (2009.01)
*H04W 74/0808* (2024.01)

(56) References Cited

U.S. PATENT DOCUMENTS

| | | | |
|---|---|---|---|
| 2010/0285809 A1 | 11/2010 | Lindstrom et al. | |
| 2017/0318594 A1* | 11/2017 | Babaei | H04W 72/087 |
| 2017/0353972 A1* | 12/2017 | Babaei | H04L 5/0098 |
| 2017/0359808 A1* | 12/2017 | Dinan | H04L 5/0053 |
| 2017/0367120 A1 | 12/2017 | Murray et al. | |
| 2018/0123744 A1* | 5/2018 | Nogami | H04W 52/248 |
| 2018/0191547 A1* | 7/2018 | Mukherjee | H04W 72/0446 |
| 2018/0255578 A1* | 9/2018 | Kim | H04W 72/1268 |
| 2018/0331968 A1* | 11/2018 | Li | H04L 1/1896 |
| 2019/0190668 A1* | 6/2019 | Lei | H04L 5/0046 |
| 2019/0208540 A1* | 7/2019 | Kim | H04W 74/0816 |
| 2019/0281636 A1* | 9/2019 | Liu | H04W 76/27 |
| 2019/0313451 A1* | 10/2019 | Liu | H04W 74/0808 |
| 2019/0394792 A1* | 12/2019 | Jeon | H04L 5/0092 |
| 2020/0037362 A1* | 1/2020 | Noh | H04L 1/1812 |
| 2020/0045735 A1* | 2/2020 | Kim | H04W 16/28 |
| 2020/0163114 A1 | 5/2020 | Chen et al. | |
| 2020/0296726 A1* | 9/2020 | Wu | H04W 72/12 |
| 2020/0336987 A1* | 10/2020 | Mukherjee | H04W 74/0808 |
| 2020/0337088 A1* | 10/2020 | Babaei | H04W 74/0808 |
| 2020/0359426 A1* | 11/2020 | Pan | H04W 16/14 |
| 2021/0014838 A1* | 1/2021 | Liou | H04W 72/23 |
| 2021/0058964 A1* | 2/2021 | Hooli | H04W 74/008 |
| 2021/0227356 A1* | 7/2021 | Hwang | H04W 72/0446 |
| 2021/0227581 A1* | 7/2021 | Karaki | H04W 74/0816 |
| 2021/0307068 A1* | 9/2021 | Kim | H04W 24/10 |
| 2021/0392683 A1* | 12/2021 | Awadin | H04B 7/088 |

FOREIGN PATENT DOCUMENTS

| | | |
|---|---|---|
| WO | 2016/073039 A1 | 5/2016 |
| WO | 2017/193843 A1 | 11/2017 |
| WO | 2017/214621 A1 | 12/2017 |

OTHER PUBLICATIONS

3rd Generation Partnership Project; Technical Specification Group Radio Access Network; Evolved Universal Terrestrial Radio Access (E-UTRA); Multiplexing and channel coding; (Release 15); 3GPP TS 36.212 V15.1.0, Mar. 2018, pp. 1-234.

3rd Generation Partnership Project; Technical Specification Group Radio Access Network; Evolved Universal Terrestrial Radio Access (E-UTRA); Physical layer procedures (Release 15); 3GPP TS 36.213 V15.1.0, Mar. 2018, pp. 1-499.

3rd Generation Partnership Project; Technical Specification Group Radio Access Network; NR; Multiplexing and channel coding; (Release 15); 3GPP TS 38.212 V15.1.1, Apr. 2018, pp. 1-94.

3rd Generation Partnership Project; Technical Specification Group Radio Access Network; NR; Physical layer procedures for control (Release 15); 3GPP TS 38.213 V15.1.0, Mar. 2018; pp. 1-77.

3rd Generation Partnership Project; Technical Specification Group Radio Access Network; NR; User Equipment (UE) radio transmission and reception; Part 2: Range 2 Standalone (Release 15); 3GPP TS 38.101-2 V15.1.0, Mar. 2018; pp. 1-46.

3rd Generation Partnership Project; Technical Specification Group Radio Access Network; NR; User Equipment (UE) radio transmission and reception; Part 3: Range 1 and Range 2 Interworking operation with other radios (Release 15); 3GPP TS 38.101-3 V15.1.0, Mar. 2018; pp. 1-78.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15); 3GPP TS 36.300, V15.0.0, Dec. 2017, pp. 1-338.

3rd Generation Partnership Project; Technical Specification Group Radio Access Network; Evolved Universal Terrestrial Radio Access (E-UTRA); Physical channels and modulation; (Release 15); 3GPP TS 36.211, V15.0.0, Dec. 2017, pp. 1-219.

3rd Generation Partnership Project; Technical Specification Group Radio Access Network; Evolved Universal Terrestrial Radio Access (E-UTRA); Physical layer procedures; (Release 15); 3GPP TS 36.213, V15.0.0, Dec. 2017, pp. 1-493.

3rd Generation Partnership Project; Technical Specification Group Radio Access Network; NR; NR and NG-RAN Overall Description; Stage 2 (Release 15); 3GPP TS 38.300, V15.1.0, Mar. 2018, pp. 1-71.

3rd Generation Partnership Project; Technical Specification Group Radio Access Network; NR; Physical channels and modulation; (Release 15); 3GPP TS 38.211, V15.1.0, Mar. 2018; pp. 1-90.

3rd Generation Partnership Project; Technical Specification Group Radio Access Network; NR; Physical layer procedures for control; (Release 15); 3GPP TS 38.213, V15.0.0, Dec. 2017; pp. 1-56.

3rd Generation Partnership Project; Technical Specification Group Radio Access Network; NR; Radio Resource Control (RRC) protocol specification; (Release 15); 3GPP TS 38.331, V15.1.0; Mar. 2018; pp. 1-268.

3rd Generation Partnership Project; Technical Specification Group Radio Access Network; NR; User Equipment (UE) radio transmission and reception; Part 1: Range 1 Standalone (Release 15); 3GPP TS 38.101-1, V15.1.0, Mar. 2018, pp. 1-71.

3rd Generation Partnership Project; Technical Specification Group Radio Access Network; Study on Scenarios and Requirements for Next Generation Access Technologies; (Release 14); 3GPP TR 38.913, V14.3.0, Jun. 2017, pp. 1-39.

R1-164013, "Framework for Beamformed Access", Samsung, 3GPP TSG RAN WG1 #85, Nanjing, China, May 23-27, 2016, pp. 1-4.

* cited by examiner

CHANNEL ACCESS WITH A NEW RADIO UNLICENSED SERVING CELL

CROSS-REFERENCE TO RELATED APPLICATIONS

This application is the National Stage Application of International Patent Application No. PCT/US2019/031508, filed May 9, 2019, which claims the benefit of U.S. Provisional Application No. 62/669,086, filed on May 9, 2018, entitled "Channel access with a new radio unlicensed serving cell", the content of which is hereby incorporated by reference in its entirety.

BACKGROUND

Machine-To-Machine (M2M), Internet-of-Things (IoT), and Web-of-Things (WoT) network deployments may include nodes such as M2M/IoT/WoT servers, gateways, and devices which host M2M/IoT/WoT applications and services. Such network deployments may include, for example, constrained networks, wireless sensor networks, wireless mesh networks, mobile ad-hoc networks, and wireless sensor and actuator networks. Operations of devices in such networks may accord with such standards and proposals as: 3GPP TS 36.300, Overall Description; Stage 2 (Release 15), V15.0.0; 3GPP TS 36.213, Physical layer procedures (Release 15), V15.0.0; 3GPP TS 36.211, Physical Channels and Modulation (Release 15), V15.0.0; 3GPP TR 38.913, Study on Scenarios and Requirements for Next Generation Access Technologies; (Release 14), V14.3.0; R1-164013, Framework for Beamformed Access, Samsung; 3GPP TS 38.300, NR; NR and NG-RAN Overall Description; Stage 2 (Release 15), V15.1.0; 3GPP TS 38.331, Radio Resource Control (RRC) protocol specification (Release 15), V15.1.0; 3GPP TS 38.213, NR; Physical Layer Procedures for Control (Release 15), V15.0.0, 3GPP TS 38.101, User Equipment (UE) radio transmission and reception; (Release 15) V15.1.0; and 3GPP TS 38.211, Physical channels and modulation (Release 15), V15.1.0.

SUMMARY

Methods to perform UL channel access with network assistance may include use of: mechanisms to Signal NW Assistance Information to a UE when performing a Random Access procedure, e.g. NR-U PDCCH order, NR-U RAR grant and NR-U MAC RAR; procedures to perform random access using NW assistance information; and NR-U PRACH Configurations using 60 kHz and 120 kHz subcarrier spacing for FR1 and unpaired spectrum. New mechanisms for signaling some parameters of the PRACH configuration may be used to provide more flexibility for the PRACH transmission occasions An enhanced CCA procedure may make use of transmission type identification code which uniquely identifies the UE serving cell or serving cell scheduler, the channel resource, and/or the channel access type, for example, contention based random access resource or non-contention based random access resources This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

A more detailed understanding may be had from the following description, given by way of example in conjunction with the accompanying drawings. The drawings are not necessarily drawn to scale.

DETAILED DESCRIPTION

Figure 1:
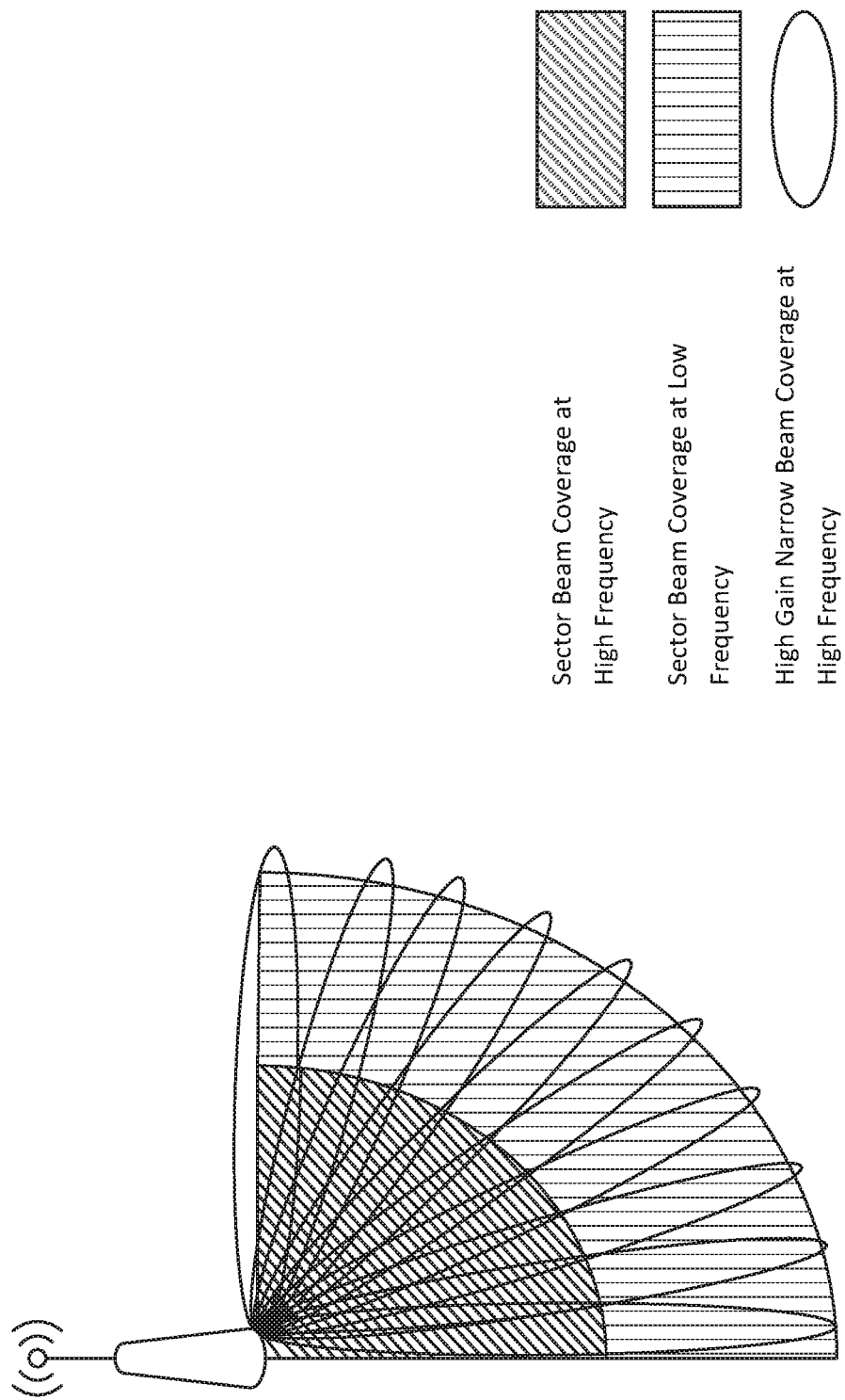
FIG. 1 illustrates cell coverage with sector beams and multiple high gain narrow beams.

Table 0 of the appendix includes many of the acronyms used herein.

LTE Licensed Assisted Access

Carrier aggregation with at least one SCell operating in the unlicensed spectrum is referred to as Licensed-Assisted Access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells. See 3GPP TS 36.300, Overall Description; Stage 2 (Release 15), V15.0.0.

LAA eNB and UE apply Listen-Before-Talk (LBT) before performing a transmission on LAA SCell. When LBT is applied, the transmitter listens to/senses the channel to determine whether the channel is free or busy. If the channel is determined to be free, the transmitter may perform the transmission; otherwise, it does not perform the transmission. If an LAA eNB uses channel access signals of other technologies for the purpose of LAA channel access, it may continue to meet the LAA maximum energy detection threshold requirement TS 36.300.

UL Channel Access Procedures

For UL, the UE can access a carrier on which LAA SCell(s) UL transmission(s) are performed according to one of Type 1 or Type 2 UL channel access procedures 3GPP TS 36.213, Physical layer procedures (Release 15), V15.0.0.

The UE may transmit the transmission using Type 1 channel access procedure after first sensing the channel to be idle during the slot durations of a defer duration $T_d$; and after the counter N is zero in step 4 of the procedure described below. The counter N is adjusted by sensing the channel for additional slot duration(s) according to the steps described below.

1. set $N=N_{init}$, where $N_{init}$ is a random number uniformly distributed between 0 and $CW_p$, and go to step 4;
2. if N>0 and the UE chooses to decrement the counter, set N=N−1;
3. sense the channel for an additional slot duration, and if the additional slot duration is idle, go to step 4; else, go to step 5;
4. if N=0, stop; else, go to step 2.
5. sense the channel until either a busy slot is detected within an additional defer duration $T_d$ or all the slots of the additional defer duration $T_d$ are detected to be idle;
6. if the channel is sensed to be idle during all the slot durations of the additional defer duration $T_d$, go to step 4; else, go to step 5;

If the UL UE uses Type 2 channel access procedure for a transmission including PUSCH, the UE may transmit the transmission including PUSCH immediately after sensing the channel to be idle for at least a sensing interval $T_{short\_ul}=25$ us. $T_{short\_ul}$ consists of a duration $T_f=16$ us immediately followed by one slot duration $T_{sl}=9$ us and $T_f$ includes an idle slot duration $T_{sl}$ at start of $T_f$. The channel is considered to be idle for $T_{short\_ul}$ if it is sensed to be idle during the slot durations of $T_{short\_ul}$.

For the solutions described herein, the term LBT is used to make reference to UL channel access procedures that are the same as or similar to the Type 1 and Type 2 UL channel access procedures used for LTE LAA.

LTE Frame Structure Type 3

Frame structure type 3 is applicable to LAA secondary cell operation with normal cyclic prefix only. Each radio frame is $T_f=307200 \cdot T_s=10$ ms long and consists of 20 slots of length $T_{slot}=15360 \cdot T_s=0.5$ ms numbered from 0 to 19. A subframe is defined as two consecutive slots where subframe i consists of slots i and 2i+1. See 3GPP TS 36.211, Physical Channels and Modulation (Release 15), V15.0.0.

The 10 subframes within a radio frame are available for downlink or uplink transmissions. Downlink transmissions occupy one or more consecutive subframes, starting anywhere within a subframe and ending with the last subframe either fully occupied or following one of the DwPTS durations in as specified in Table 4.2-1 of TS 36.211. Uplink transmissions occupy one or more consecutive subframes.

NextGen Network Requirements

3GPP TR 38.913, Study on Scenarios and Requirements for Next Generation Access Technologies; (Release 14), V14.3.0, defines scenarios and requirements for next generation access technologies. The Key Performance Indicators (KPIs) for eMBB, URLLC, and mMTC devices are summarized in the Table 1.

NR Beamformed Access

Currently, 3GPP standardization's efforts are underway to design the framework for beamformed access. The characteristics of the wireless channel at higher frequencies are significantly different from the sub-6 GHz channel that LTE is currently deployed on. The key challenge of designing the new Radio Access Technology (RAT) for higher frequencies will be in overcoming the larger path-loss at higher frequency bands. In addition to this larger path-loss, the higher frequencies are subject to an unfavorable scattering environment due to blockage caused by poor diffraction. Therefore, MIMO/heamforming is essential in guaranteeing sufficient signal level at the receiver end. See R1-164013, Framework for Beamformed Access, Samsung.

Relying solely on MIMO digital preceding used by digital BF to compensate for the additional path-loss in higher frequencies seems not enough to provide similar coverage as below 6 GHz. Thus, the use of analog beamforming for achieving additional gain can be an alternative in conjunction with digital beamforming. A sufficiently narrow beam should be formed with lots of antenna elements, which is likely to be quite different from the one assumed for the LTE evaluations. For large beamforming gain, the beam-width correspondingly tends to be reduced, and hence the beam with the large directional antenna gain cannot cover the whole horizontal sector area specifically in a 3-sector configuration. The limiting factors of the number of concurrent high gain beams include the cost and complexity of the transceiver architecture.

From these observations above, multiple transmissions in time domain with narrow coverage beams steered to cover different serving areas are necessary. Inherently, the analog beam of a subarray can be steered toward a single direction at the time resolution of an OFDM symbol or any appropriate time interval unit defined for the purpose of beam steering across different serving areas within the cell, and hence the number of subarrays determines the number of beam directions and the corresponding coverage on each OFDM symbol or time interval unit defined for the purpose of beams steering. In some literature, the provision of multiple narrow coverage beams for this purpose has been called "beam sweeping". For analog and hybrid beamforming, the beam sweeping seems to be essential to provide the basic coverage in NR. This concept is illustrated in FIG. 1 where the coverage of a sector level cell is achieved with sectors beams and multiple high gain narrow beams. Also, for analog and hybrid beamforming with massive MIMO, multiple transmissions in time domain with narrow coverage beams steered to cover different serving areas is essential to cover the whole coverage areas within a serving cell in NR.

One concept closely related to beam sweeping is the concept of beam pairing which is used to select the best beam pair between a UE and its serving cell, which can be used for control signaling or data transmission. For the downlink transmission, a beam pair will consist of UE RX beam and NR-Node TX beam while for uplink transmission, a beam pair will consist of LIE TX beam and NR-Node RX beam.

Another related concept is the concept of beam training which is used for beam refinement. For example, as illustrated in FIG. 1, a coarser sector beamforming may be applied during the beam sweeping and sector beam pairing procedure. A beam training may then follow where for example the antenna weights vector is refined, followed by the pairing of high gain narrow beams between the UE and NR-Node.

NR Random Access Procedure

The random access procedure is triggered by a number of events, for instance:
Initial access from RRC_IDLE;
RRC Connection Re-establishment procedure;
Handover;
DL or UL data arrival during RRC_CONNECTED when UL synchronisation status is "non-synchronised";
Transition from RRC_INACTIVE;
Request for Other SI.
Beam failure recovery
See 3GPP TS 38.300, NR; NR and NG-RAN Overall Description; Stage 2 (Release 15), V15.1.0.

Figure 2:
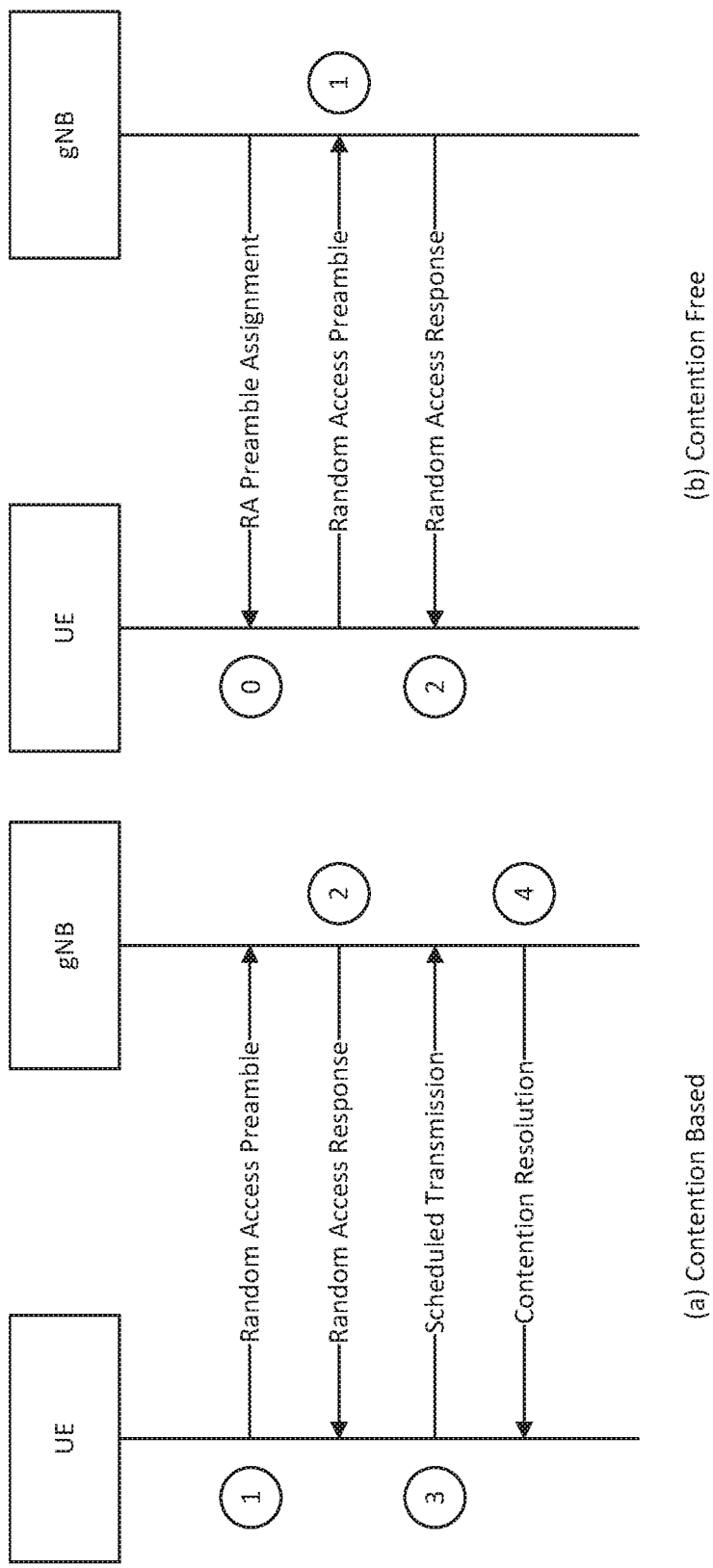
FIG. 2 and example new radio (NR) random access procedure.

Furthermore, the random access procedure takes two distinct forms: contention based and contention free as shown in FIG. 2. Normal transmission can take place after the random access procedure.

For initial access in a cell configured with SUL, the UE selects the SUL carrier if and only if the measured quality of the DL is lower than a broadcast threshold. Once started, all uplink transmissions of the random access procedure remain on the selected carrier.

Random Access Configurations

Figure 3:
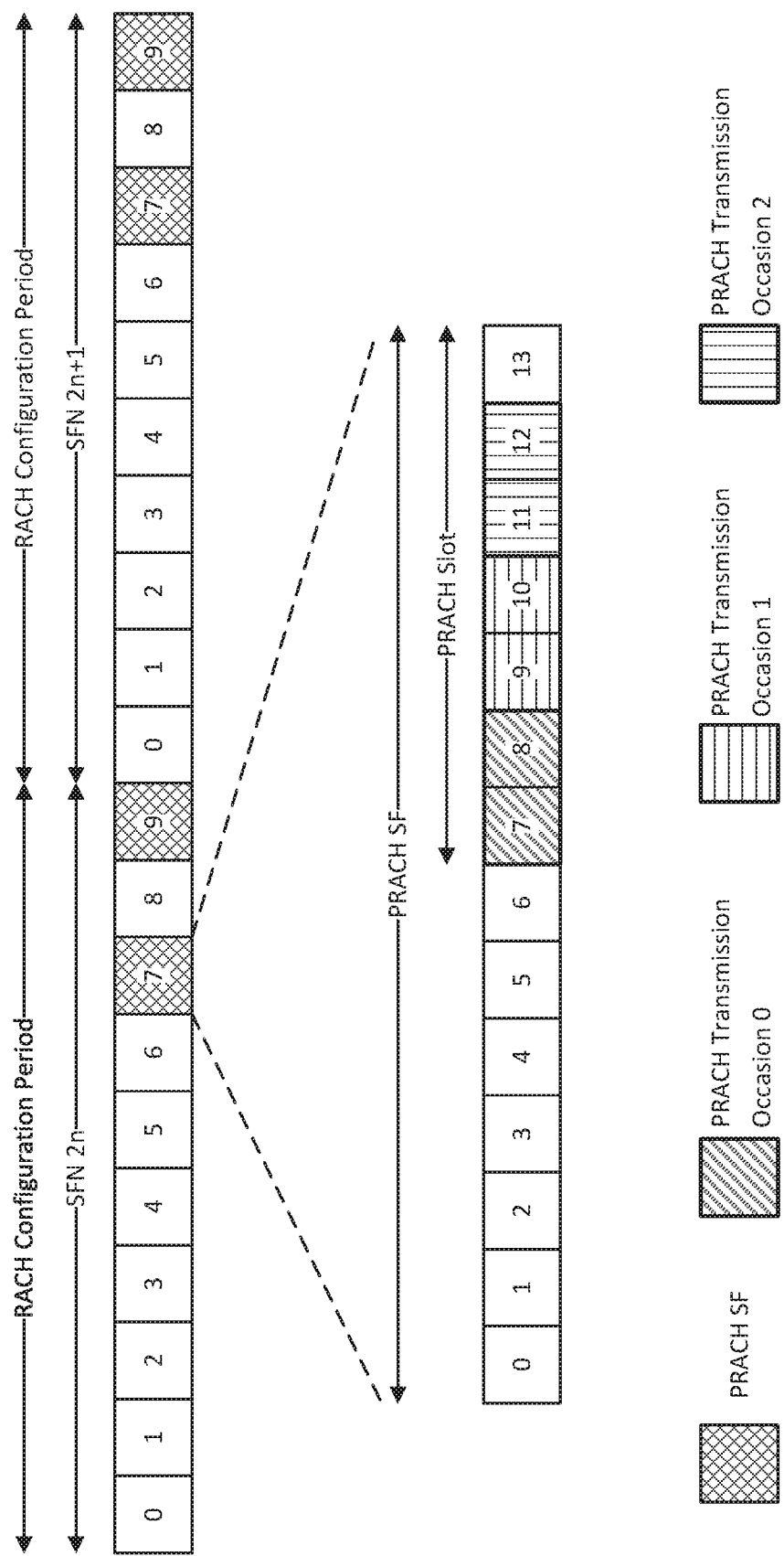
FIG. 3 is a timing diagram for an example FR1 PRACH configuration index 86 for unpaired spectrum.

The RACH-ConfigGeneric IE is used to specify the cell specific random-access parameters both for regular random access as well as for beam failure recovery. See 3GPP TS 38.331, Radio Resource Control (RRC) protocol specification (Release 15), V15.1.0.This IE includes the prach-ConfigurationIndex field, which specifies the PRACH configuration that is being used. FIG. 3, is an illustration of an FR1 PRACH configuration for unpaired spectrum corresponding to PRACH Configuration Index 86 that is used to illustrate embodiments of the solutions described herein.

Interaction Model Between L1 and L2/3 for Random Access Procedure

Figure 4:
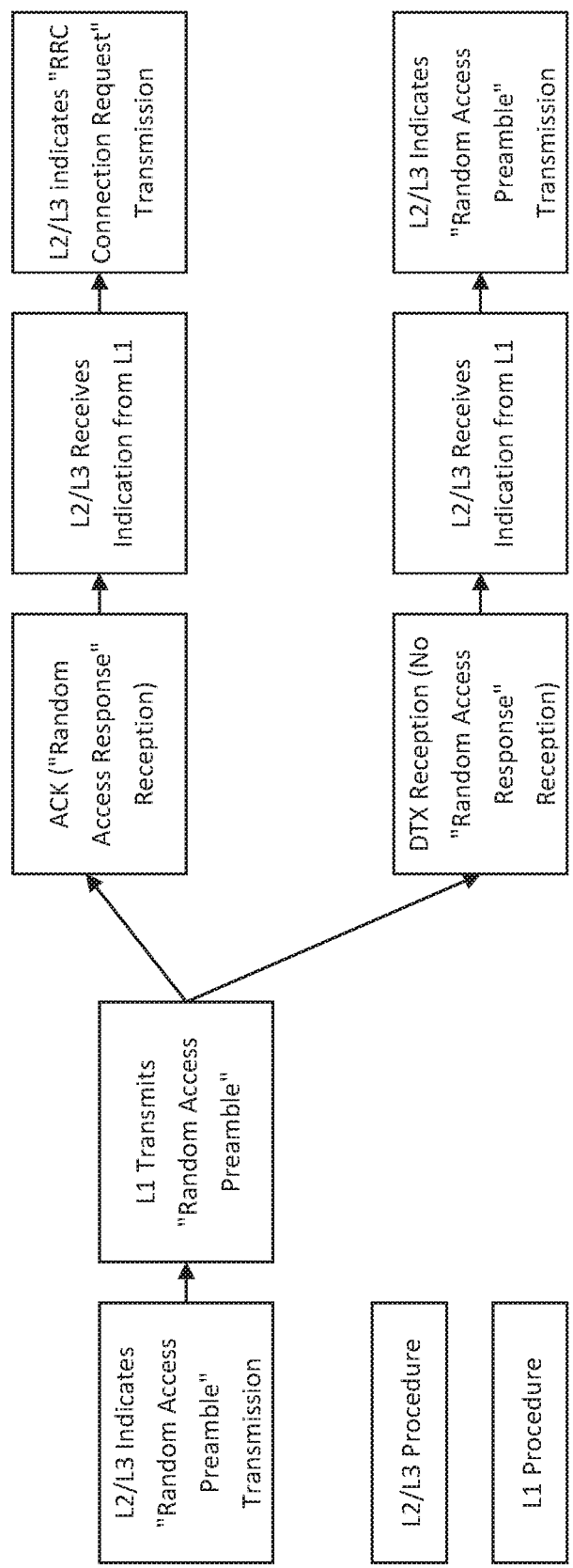
FIG. 4 is a block diagram of an example interaction model between L1 and L2/3 for a random access procedure.

Random access procedure described above is modelled in FIG. 4 below from L1 and L2/3 interaction point of view. L2/L3 receives indication from L1 whether ACK is received or DTX is detected after indication of Random Access Preamble transmission to L1. L2/3 indicates L1 to transmit first scheduled UL transmission (RRC Connection Request in case of initial access) if necessary or Random Access Preamble based on the indication from L1.

NR Bandwidth Adaption

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one. See 3GPP TS 38.213, NR; Physical Layer Procedures for Control (Release 15), V15.0.0.

Figure 5:
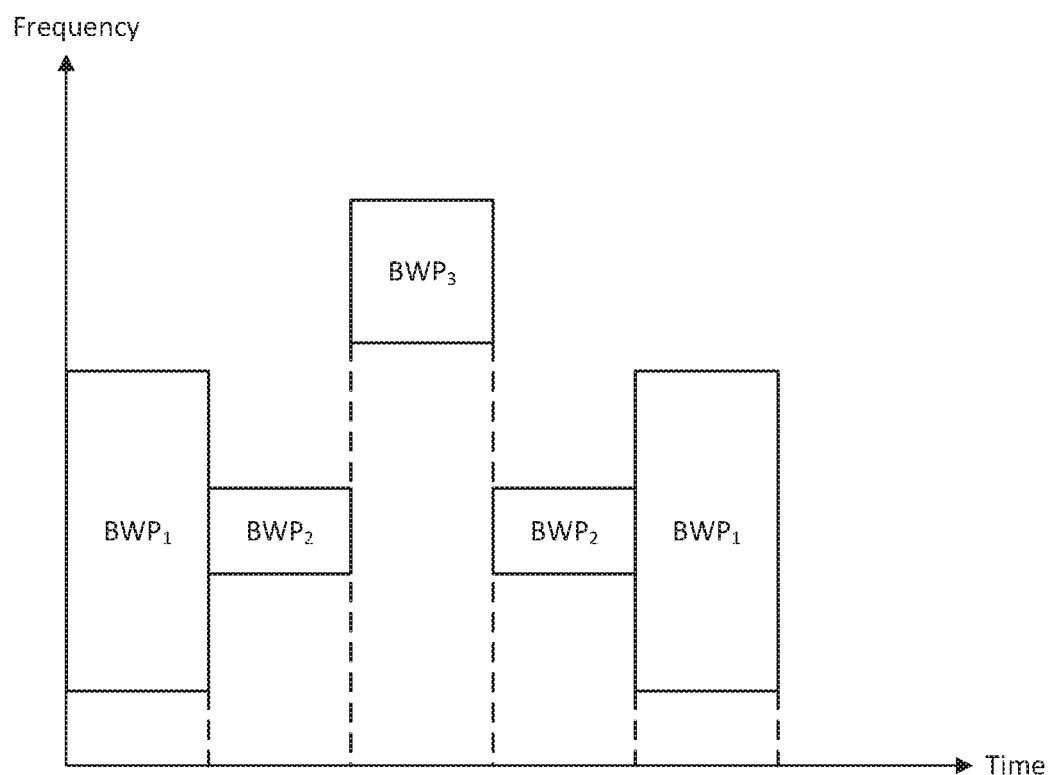
FIG. 5 illustrates a bandwidth adaptation example.

FIG. 5 describes a scenario where 3 different BWPs are configured:
BWP1 with a width of 40 MHz and subcarrier spacing of 15 kHz;
BWP2 with a width of 10 MHz and subcarrier spacing of 15 kHz;
BWP3 with a width of 20 MHz and subcarrier spacing of 60 kHz.

A Serving Cell may be configured with at most four BWPs, and for an activated Serving Cell, there is always one active BWP at any point in time. The BWP switching for a Serving Cell is used to activate an inactive BWP and deactivate an active BWP at a time, and is controlled by the PDCCH indicating a downlink assignment or an uplink grant. Upon addition of SpCell (Special Cell) or activation of an SCell, one BWP is initially active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL TS 38.213.

Challenges

A UE applies Listen-Before-Talk (LBT) before performing a transmission on an NR-U Serving Cell. When LBT is applied, the UE performs a Clear Channel Assessment (CCA) to determine whether the channel is free or busy. If the channel is determined to be free, the UE may perform the transmission; otherwise, the UE does not perform the transmission.

LBT may fail if transmissions from neighboring UEs (e.g. PUSCH, PDCCH, SRS, RACH, etc.) overlap with the CCA period even though the multiplexing techniques being used (e.g. Code Division Multiplexing (CDM), Frequency Division Multiplexing (FDM), Time Division Multiplexing (TDM)), would allow the transmission to be performed without causing interference to the neighboring UEs.

For example, the random access design allows multiple UEs (up to 64) to share the same PRACH resource during a PRACH transmission occasion. If one or more neighboring UE transmissions overlap with the CCA period, the channel may be considered "busy", preventing the UE from commencing with preamble transmission, even though the multiplexing techniques being used would allow the transmission to be performed without causing interference to the neighboring UEs. Therefore, the random access procedure should be enhanced to ensure UL from neighboring UEs do not prevent a UE from transmitting the preamble. The following scenarios may be considered:

Scenario 1: LBT may fail because of contention based preamble transmission by other users of the channel, from the same cell.

Scenario 2: LBT may fail because of non-contention based preamble transmission by other users of the channel, from the same cell.

Scenario 3: LBT may fail because of other UL transmissions; e.g. PUSCH, PUCCH, SRS by other users of the channel, from the same cell.

Scenario 4: LBT may fail because of transmissions by other users of the channel; e.g. Wi-Fi users, or users from other cells of the same PLMN or different PLMNs.

Because of the potential scenarios above, in order to ensure the UE defers transmission in scenario 4 while it doesn't defer transmission in scenario 1, 2 and 3, the UE has to be able to differentiate scenario 4 from the other scenarios. For e.g. the LIE needs to be able to differentiate channel being busy as result of Wi-Fi transmission from channel busy as a result of cellular data transmission such as PUSCH, PUCCH, SRS or RACH. Methods to perform such differentiations need to be investigated.

UL Channel Access with Network Assistance

As was discussed in the problem statement described herein, the channel access procedure; e.g. LBT, performed by the UE may fail if transmissions from neighboring UEs (e.g. transmitting PUSCH, PUCCH, SRS, RACH, etc.) that are under control of the same scheduler and intended to be multiplexed with the UL transmissions of a given UE, overlap with the CCA period. To address this problem, the gNB may provide the UE with Network Assistance Information that is used by the UE to determine and/or adapt the channel access procedure that may be performed prior to performing an UL transmission.

A UE receiving Network Assistance Information may then forego performing an LBT procedure prior to performing an UL transmission or may use a different set of configuration parameters for the LBT procedure; e.g. a different energy detection threshold ($X_{Thresh}$), sensing interval/defer duration ($T_d$), Contention Window (CW) size, etc.

The NW Assistance Information may be based, at least in part, on the result of an LBT procedure performed by the gNB, or on upcoming transmissions from neighboring UEs under control of the same scheduler, and/or on upcoming transmissions from neighboring UEs under control of a different scheduler when there is coordination between the two schedulers.

The, the Network Assistance Information may be comprised of channel access information which may include the Channel Access Type and/or the Channel Access Priority Class. The channel access information may be used by the UE to determine the type of UL channel access procedure and set of configuration parameters that may be used. For example, the Channel Access Type may be used to adapt the LBT procedure based on the radio environment, while the Channel Access Priority Class may be used to provide QoS differentiation when performing the LI channel access procedure. The Network Assistance Information may include explicit values for parameters to be used when performing an LBT procedure; e.g. energy detection threshold ($X_{Thresh}$), sensing interval/defer duration ($T_d$), Contention Window (CW) size, etc. Alternatively, the values to use for a given Channel Access Type may be semi-statically configured or predefined per the standards.

The following is a list of exemplary Channel Access Types and corresponding UL channel access procedures that may be defined:

Type 1: LBT with random backoff using default configuration set;

Type 2: LBT without random backoff using default configuration set;

Type 3: without random backoff, using alternate configuration set; e.g. higher $X_{Thresh}$ and/or shorter sensing interval/defer duration ($T_d$) with respect to default configuration set;

Type 4: No LBT.

For NR-U, the UE behavior for a Type 1 and Type 2 channel access type may be defined to be the same as or similar to the behavior defined for Type 1 and Type 2 channel access for LAA.

The behavior for Type 3 channel access may be defined to be more aggressive when accessing the channel. For example, the sensing interval $T_{short\_ul}$ may be defined to consist of a single time duration $T_{sl}=9$ us and the energy detection $X_{thresh}$ may be set to a higher value when compared to the value used for Type 2. The channel is considered to be idle for $T_{short\_ul}$ if it is sensed to be below the $X_{thresh}$ during the sensing interval $T_{short\_ul}$.

The behavior for Type 4 may be such that the UE performs the transmission immediately without performing LBT.

Additional channel access types may be defined as needed.

Alternatively, the Network Assistance Information may be comprised of a Clear-to-Send (CTS) that may be used to indicate whether or not the UE may forego performing an LBT procedure.

Figure 6:
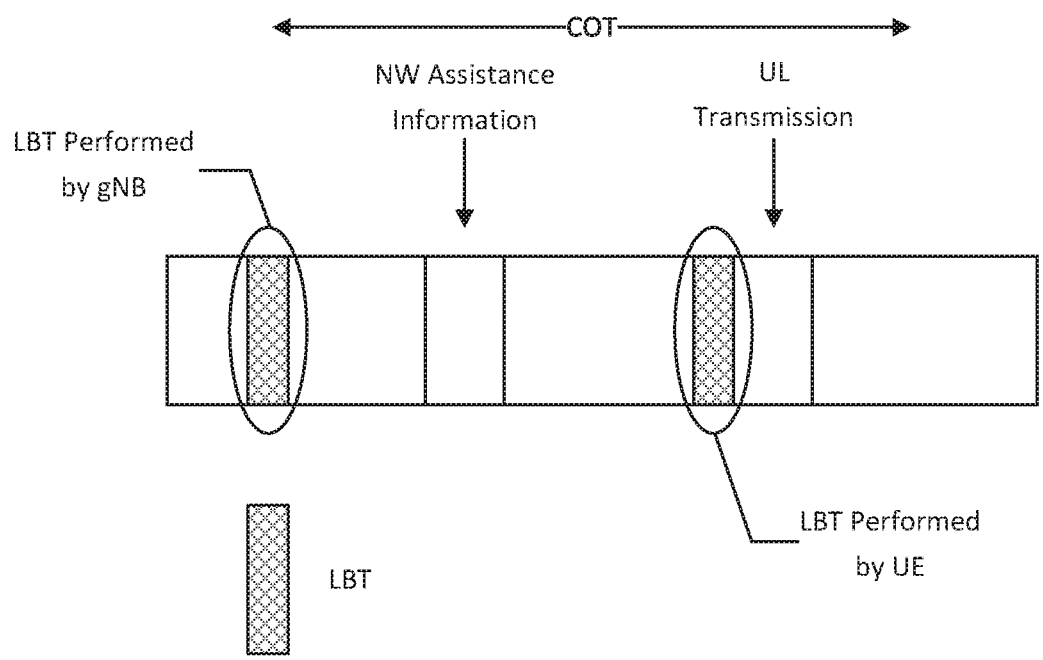
FIG. 6 is a timing diagram for example for signaling of network assistance information.

To ensure the NW Assistance Information is valid when the UE performs its channel access procedure; e.g. LBT, the DL transmission may be used to send the Network Assistance Information and the UL transmission performed by the UE, occur during the same Channel Occupancy Time (COT) as shown in FIG. 6.

The network assistance information may include the resource allocation information for e.g. transmission duration and transmission opportunities or occurrences in time. Resource allocation information may include frequency resource allocation information. Based on this information, the UE knows when users from the same serving cell are transmitting, and when they are not transmitting. The UE may use this information to decide on whether or not to defer its transmission, for e.g. the UE may not perform carrier sensing function of the Clear Channel Assessment (CCA) aims at detection and decoding intra-serving cell channel signal detection. The UE may rely solely on energy level detection function of CCA. In this case, if the LBT results indicates channel busy, the UE may defer its transmission since the channel must be busy as a result of transmission from co-channel users, in non-serving cells, or in non-serving cellular RAT or in non-cellular systems such as Wi-Fi.

The Network Assistance Access Information may be signaled to the UE via L1 signaling (e.g. DCI) or higher layer signaling (e.g. MAC CE, RRC message). Dedicated, group-based. or broadcast signaling made be used to transmit the Network Assistance Information. Furthermore, when the assistance information is configured to the UE using DCI signaling, the UEs of the serving cell may be addressed using group PDCCH.

Random Access

An NR-U Serving Cell may be configured as an SCell, PSCell or PCell depending on the deployment scenario.

For Carrier Aggregation (CA) between a licensed band NR (PCell) and NR-U (SCell), Random Access may be performed with the NR-U SCell for the following events:
To establish time alignment with the NR-U SCell;
Beam Failure Recovery.

For Dual Connectivity (DC) between licensed band LTE (PCell) and NR-U (PSCell), Random Access may be performed with the NR-U PSCell for the following events:
SCG addition/modification;
UL/DL data arrival when UL is "non-synchronized" or there are no PUCCH resources;
  DL data arrival triggers RACH on NR-U PSCell or NR-U SCell of SCG when LI is "not synchronized";
  UL data arrival triggers RACH on NR-U PSCell when UL is "not synchronized" or there are no PUCCH resources.
Beam Failure Recovery.

For Stand-Alone (SA) NR-U, Random Access may be performed with an NR-U SA cell for the following events:
Initial access;
RRC Connection Re-establishment;
Handover;
UL DL data arrival when the UL is "non-synchronized" or there are no PUCCH resources;
Transition from RRC_INACTIVE;
Request for Other SI; or
Beam Failure Recovery.

Figure 7:
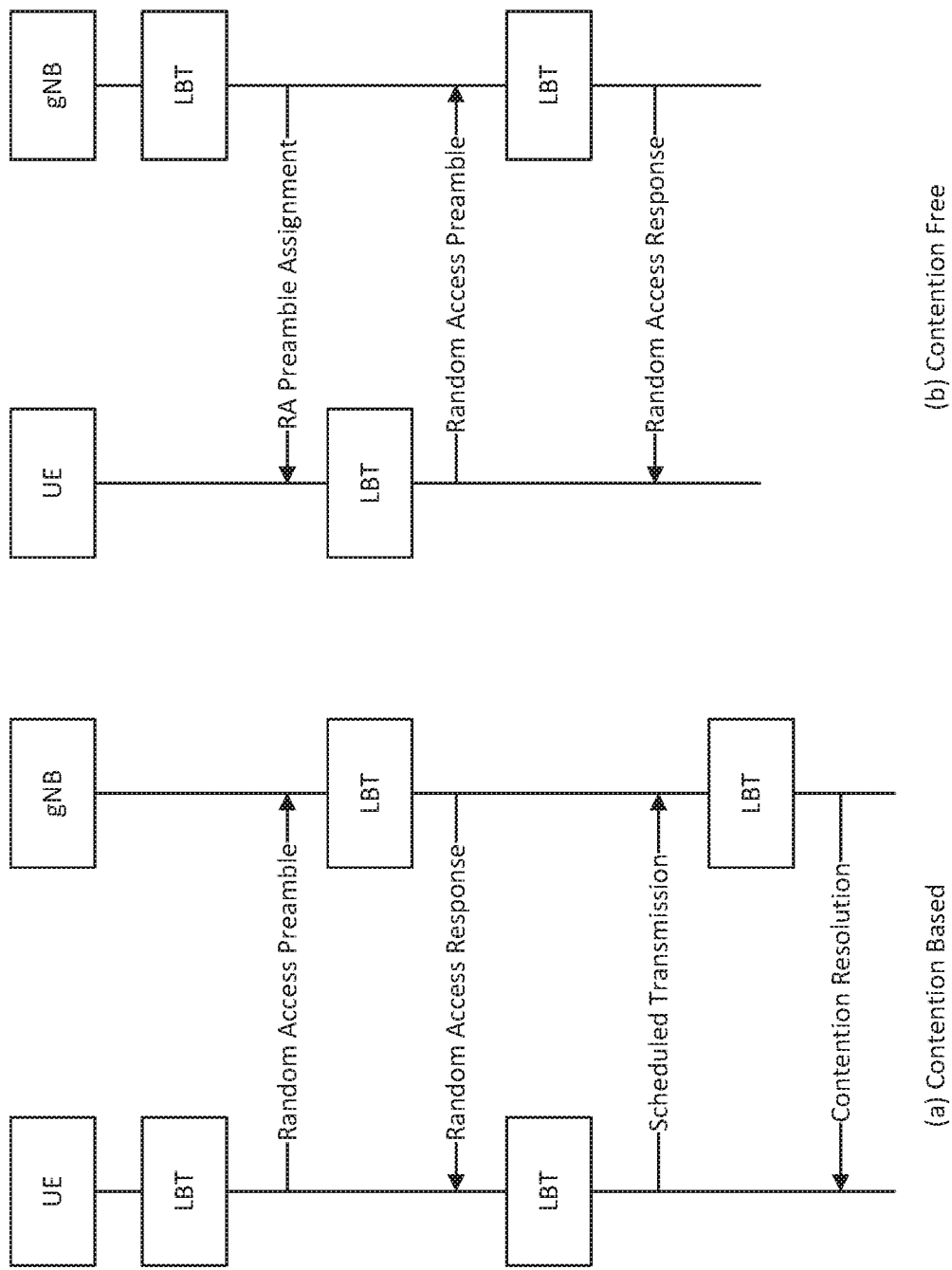
FIG. 7 is a call flow of an example NR-U random access procedure.

When performing Random Access with an NR-U Serving Cell, each step of a Random Access procedure may require a channel access procedure; e.g., LBT, to be performed by the transmitting node as shown in FIG. 7.

To prevent the UE from deferring to transmissions from neighboring UEs that overlap with the CCA period, the gNB may provide the UE with Assistance Information that is used by the UE to determine and/or adapt the channel access procedure that may be performed prior to transmitting the Random Access preamble.

Mechanisms to Signal NW Assistance Information

Figure 8:
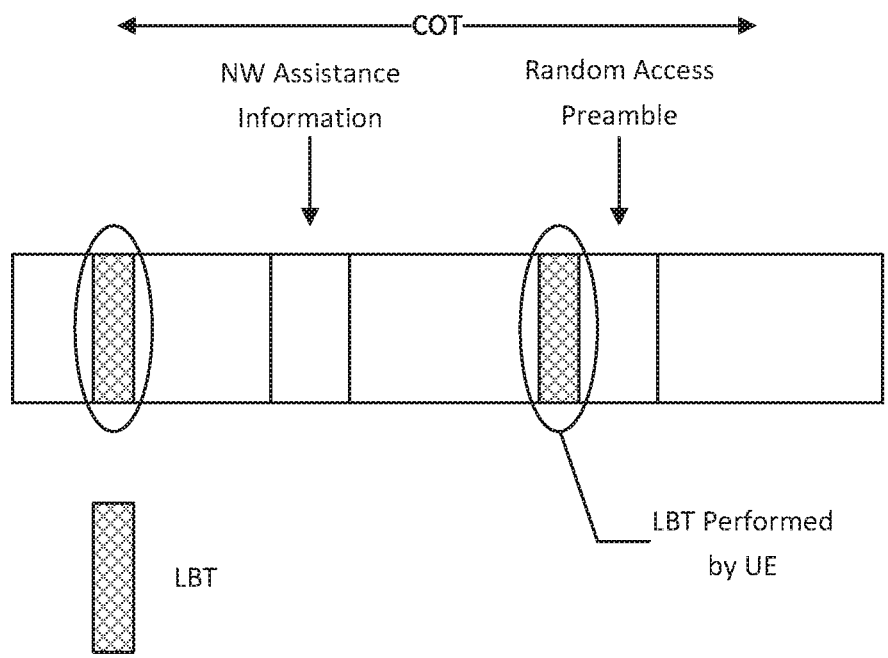
FIG. 8 is a timeline of example signaling network assistance information for random access preamble transmission.

To ensure the NW Assistance Information is valid when the UE performs its channel access procedure; e.g. LBT, the DL transmission may be used to send the NW Assistance Information and the transmission of the Random Access Preamble, occur during the same COT as shown in FIG. 8.

The NW Assistance Information may be signaled to the UE via L1 signaling (e.g. DCI) or higher layer signaling (e.g. MAC CE, RRC message) which may be transmitted using dedicated, group-based, or broadcast signaling.

Table 2 is an exemplary definition of a DCI format that may be used to signal the NW Assistance Information. The DCI may be scrambled by C-RNTI or Network Assistance-RNTI (NA-RNTI), where the NA-RNTI is assigned a unique value; e.g. 0xFFFD, with respect to the existing RNTI values.

In this example, the NW Assistance Information is comprised of a Channel Access Type field that is used to indicate the type of channel access procedure that may be performed prior to transmission of the random access preamble. The Channel Access Type field may be defined such that a value of 0 corresponds to Type 1, a value 1 to Type 2, etc., where the access types may be predefined in accordance with the exemplary Channel Access Types described herein.

The DCI format may be extended to include additional fields such as Channel Access Priority Class, which may be used to adapt the channel access procedure based on the QoS of the service associated with the triggering event.

The NW Assistance Information may be transmitted on a group common PDCCH scrambled with the NA-RNTI. Alternatively, the NW Assistance information may be transmitted using a DCI format scrambled with C-RNTI for UE specific indication. For example, when a HE performs a contention free random access procedure.

This DCI may be transmitted in a CORESET preceding the PRACH resources. This may be the same as the CORESET for the Type0-PDCCH common search space or Type1-PDCCH common search space. Alternatively, this may be a different CORSET configured by a higher layer parameter; e.g. nw-assistance-coreset-configuration.

The UE may monitor for the NW Assistance Information in a common search space (e.g., Type0-PDCCH common search space, Type1-PDCCH common search space) or a UE specific search space, for example if scrambled with C-RNTI. The UE may also be configured to monitor a NW Assistance search space that may be configured by a higher layer parameter, e.g., nw-assistance-SearchSpace.

UEs configured to monitor this DCI will detect the NW Assistance Information that will then be used to determine and/or adapt the channel access procedure that may be performed prior to transmitting the Random Access preamble.

If the Network Assistance Information DCI is not received by a HE but either SSB, CSI-RS, group common PDCCH or other PDCCH in the common search space is detected on the DL by the LIE, then the detected SSB, CSI-RS, group common PDCCH or other PDCCH may be used as an implicit indication from the gNB for the COT. In this case, HE may use the configured or fallback channel access type for channel access procedure. If neither Network Assistant Information DCI, nor any DL signal (e.g., SSB and CSI-RS) or PDCCH is detected, e.g. due to poor channel conditions or DL LBT failure, the UE may assume a default channel access type; e.g. Type 1 as described herein, may be used to perform the channel access procedure prior to transmission of the random access preamble. Alternatively, the UE may "drop" the preamble transmission if the Network Assistance Information DCI is not received.

When performing a network triggered random access procedure, the gNB may transmit the NW Assistance Information to the UE in response to the event that triggered the random access procedure; e.g. DL data arrival, handover, to establish time alignment with an NR-U SCell, SCG addition/modification, etc. For these scenarios, NW Assistance Information may be signaled in the message that is used to trigger the random access procedure, provided that message and the corresponding PRACH transmission opportunity used to transmit the random access preamble occur during the same COT.

Figure 9:
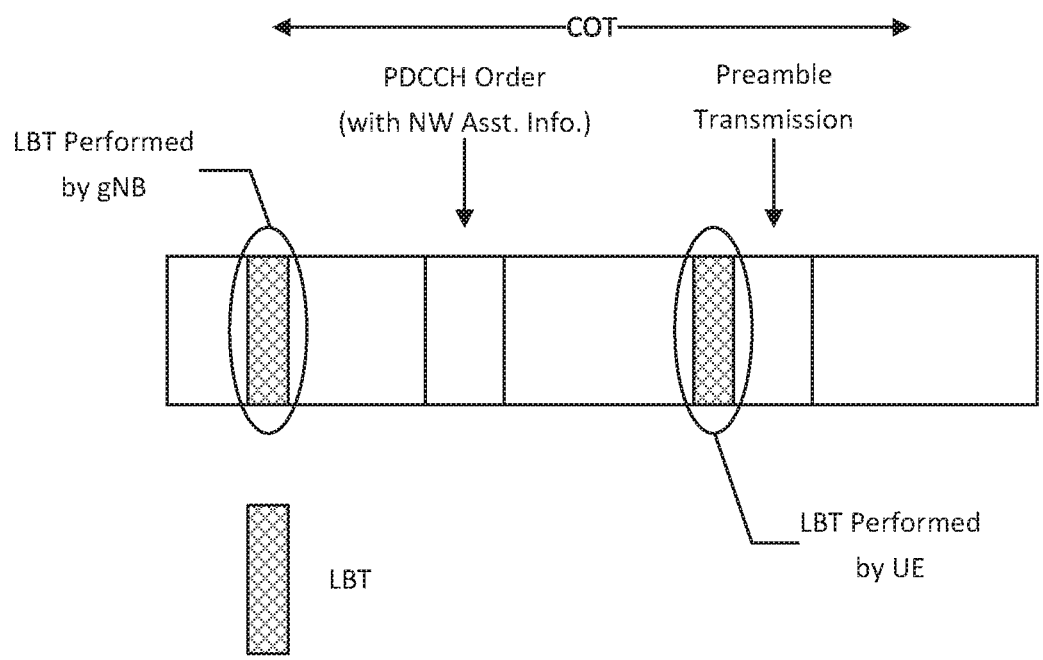
FIG. 9 is a timeline of example signaling of NW assistance information via a PDCCH order.

FIG. 9 is an illustration of the timeline for a scenario where the Random Access procedure is triggered by the gNB using a PDCCH order that includes the NW Assistance Information.

Table 3 is an exemplary definition of an NR-U PDCCH order that may be used to signal the NW Assistance Information. In this example, the NW Assistance Information is comprised of a Channel Access Type field that is used to indicate the type of channel access procedure that may be performed prior to transmission of the random access preamble. The Channel Access Type field may be defined such that a value of 0 corresponds to Type 1, a value 1 to Type 2, etc., where the access types may be predefined in accordance with the exemplary Channel Access Types described herein.

The NR-U PDCCH order may be extended to include additional fields such as Channel Access Priority Class, which may be used to adapt the channel access procedure based on the QoS of the service associated with the triggering event.

Alternatively, the NW Assistance Information may be signaled in a different message than the message that is used to trigger the random access procedure. This allows the message that is used to trigger the random access procedure and the message that is used to provide the NW Assistance Information to be transmitted during different COT's.

Figure 10:
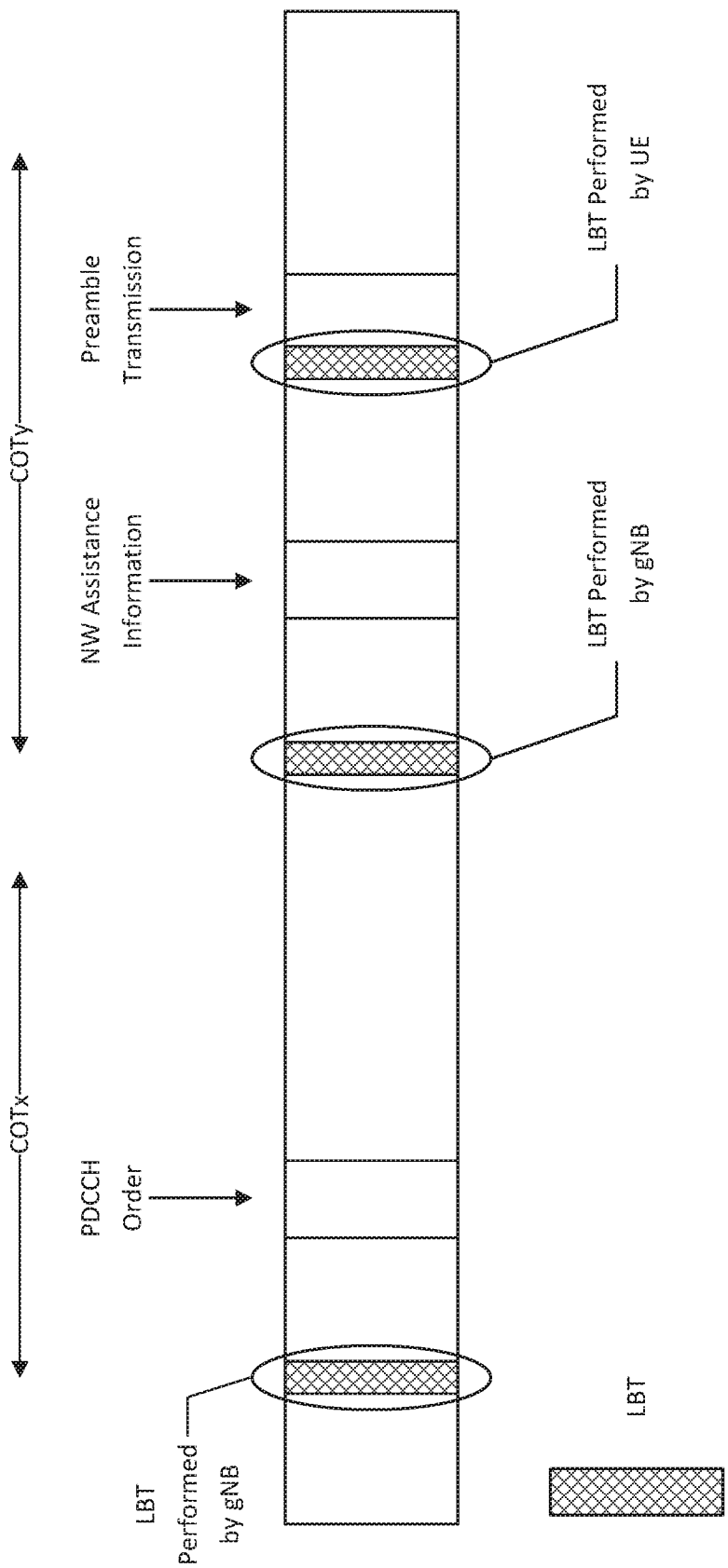
FIG. 10 is a timeline of example signaling of PDCCH order and preamble transmission in different COTs.

FIG. 10 is an illustration of a scenario where a PDCCH order used to trigger the random access procedure is transmitted during $COT_x$ and the NW Assistance Information is transmitted during $COT_y$, where $COT_x$ and $COT_y$ may or may not be consecutive.

Figure 11:
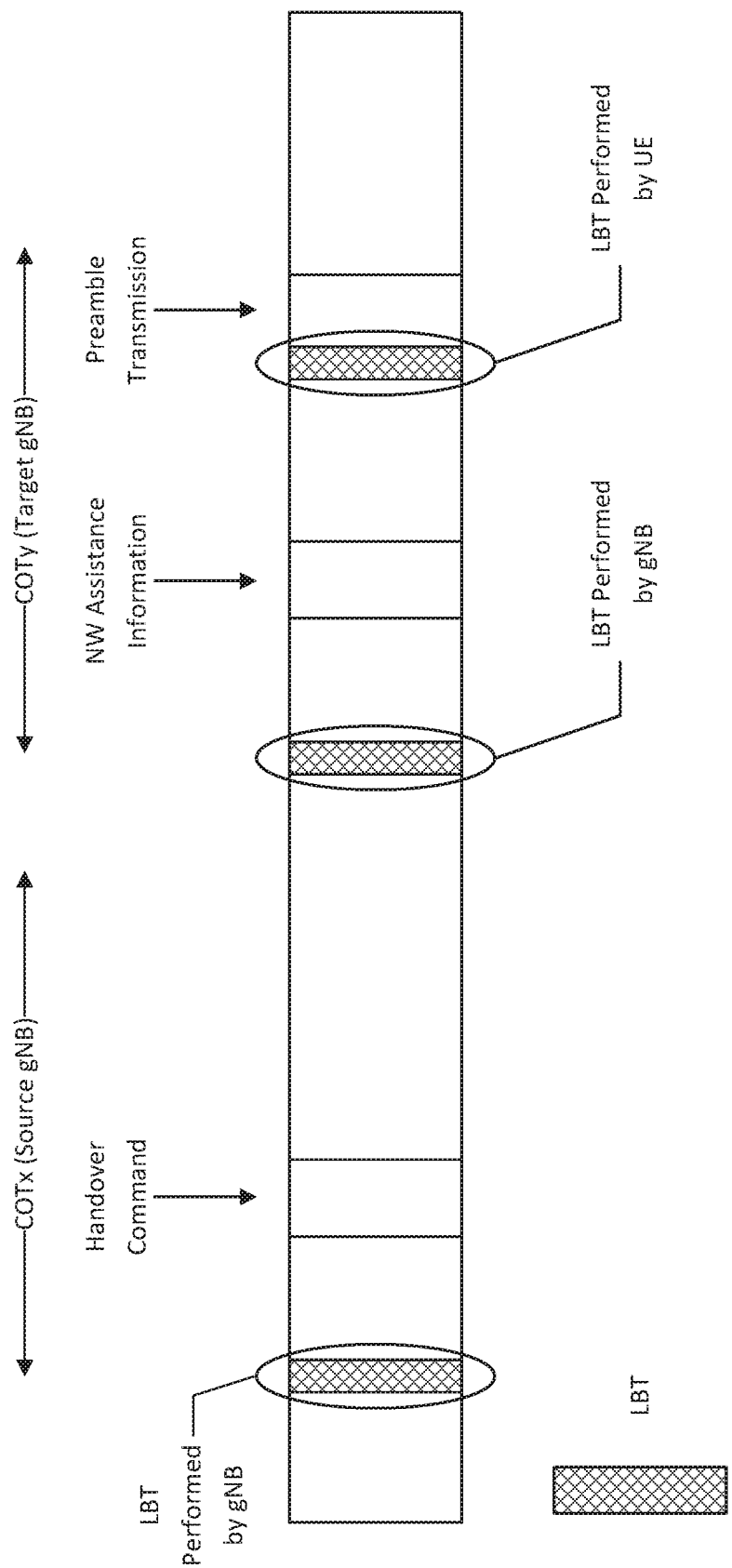
FIG. 11 is a timeline of example signaling for a handover command and preamble transmission in different COTs.

FIG. 11 is an illustration of a scenario where a handover command used to trigger the random access procedure is transmitted by the source gNB during $COT_x$ and the NW Assistance Information is transmitted by the Target gNB during $COT_y$.

The RAR signaled during the Random Access procedures described herein may also include NW Assistance Information that is used by the UE to determine and/or adapt the channel access procedure that may be performed prior to the UL transmission scheduled by the RAR UL grant.

For example, the NW Assistance Information may be included as a field in the RAR UL grant. Table 4 is an exemplary definition of an NR-U RAR UL grant that may be used to signal the NW Assistance Information. In this example, the NW Assistance Information is comprised of a Channel Access Type field that is used to indicate the type of channel access procedure that may be performed prior to the scheduled UL transmission. The Channel Access Type field may be defined such that a value of 0 corresponds to Type 1, a value 1 to Type 2, etc., where the access types may be predefined in accordance with the exemplary Channel Access Types described herein.

The NR-U RAR UL grant may be extended to include additional fields such as Channel Access Priority Class, which may be used to adapt the channel access procedure based on the QoS of the UL transmission scheduled by the RAR UL grant.

Figure 12:
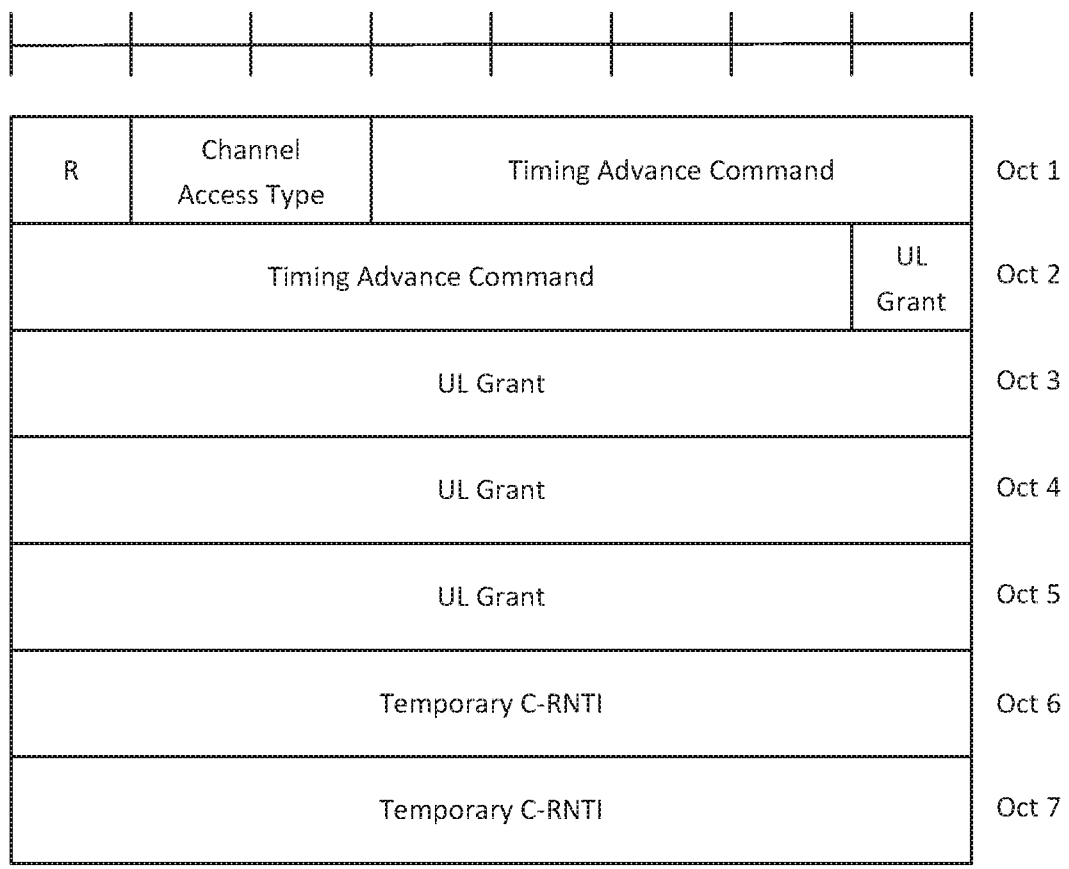
FIG. 12 shows an example of MAC RAR with NW assistance information.

Alternatively, the NW Assistance Information may be signaled as a field in the MAC payload for the RAR. An exemplary MAC RAR that may be used to signal the NW Assistance Information is depicted in FIG. 12. In this example, the NW Assistance Information is comprised of a Channel Access Type. The fields of the MAC RAR may be defined as follows:

R: Reserved bit, set to "0";
Channel Access Type: The Channel Access Type field indicates the type of channel access procedure that may be performed prior to the scheduled UL transmission and is 3 bits. The Channel Access Type field may be defined such that a value of 0 corresponds to Type 1, a value 1 to Type 2, etc., where the access types may be predefined in accordance with the exemplary Channel Access Types described herein.

Timing Advance Command: The Timing Advance Command field indicates the index value $T_A$ used to control the amount of timing adjustment that the MAC entity has to apply in TS 38.213. The size of the Timing Advance Command field is 12 bits;

UL Grant: The Uplink Grant field indicates the resources to be used on the uplink in TS 38.213. The size of the UL Grant field is 25 bits;

Temporary C-RNTI: The Temporary C-RNTI field indicates the temporary identity that is used by the MAC entity during Random Access. The size of the Temporary C-RNTI field is 16 bits.

The MAC RAR with NW Assistance information may be extended to include additional fields such as Channel Access Priority Class, which may be used to adapt the channel access procedure based on the QoS of the UL transmission scheduled by the RAR UL grant.

For scenarios where the Random Access Preamble and the UL transmission scheduled via the RAR occur during the same COT, the NW Assistance Information that is used to determine/adapt the channel access procedure that may be performed prior to transmitting the Random Access Preamble may also be used to determine/adapt the channel access procedure that may be performed prior to performing any UL transmissions scheduled by the RAR UL grant.

Random Access Using NW Assistance Information

Figure 13:
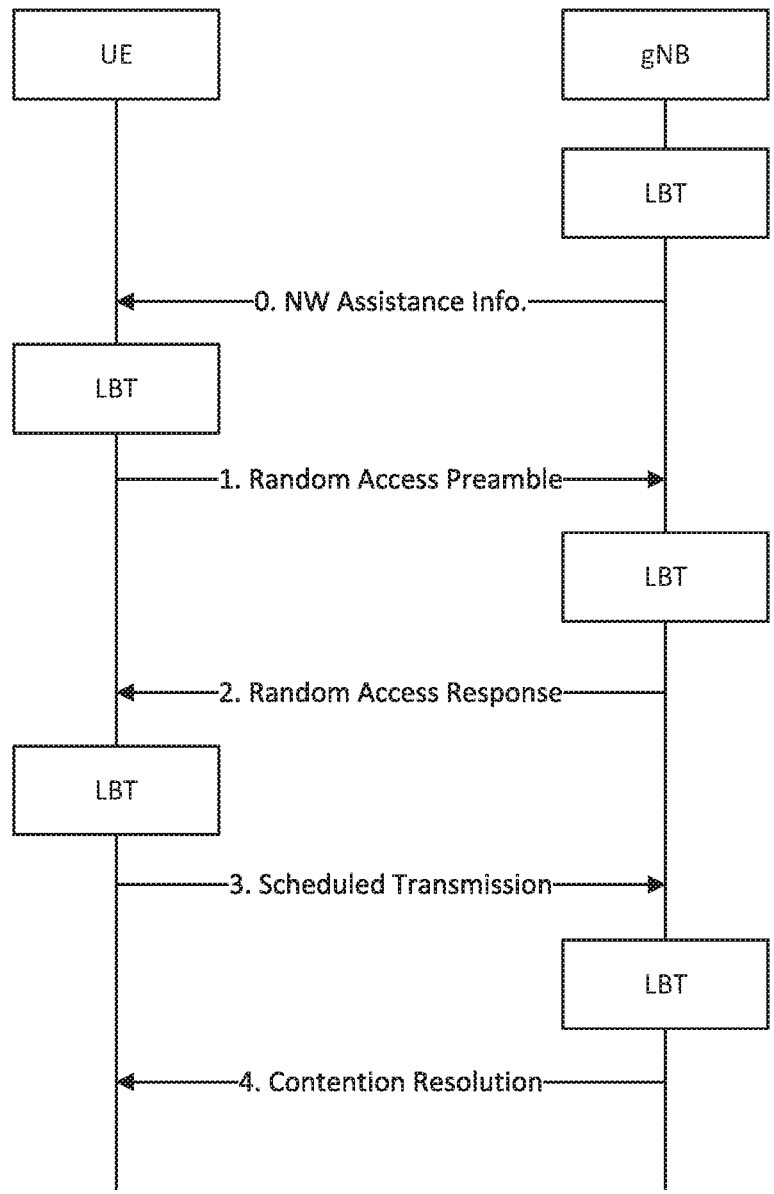
FIG. 13 is a call flow of an example NR-U contention based random access procedure with NW assistance information.

FIG. 13 is an illustration of the signaling for an NR-U Contention Based Random Access Procedure with NW Assistance Information. In this example, the transmission of the NW Assistance Information and the Random Access Preamble occur during the same COT, as shown in FIG. 8. The transmission of the remaining messages may occur during this COT or during different COT's.

Figure 14:
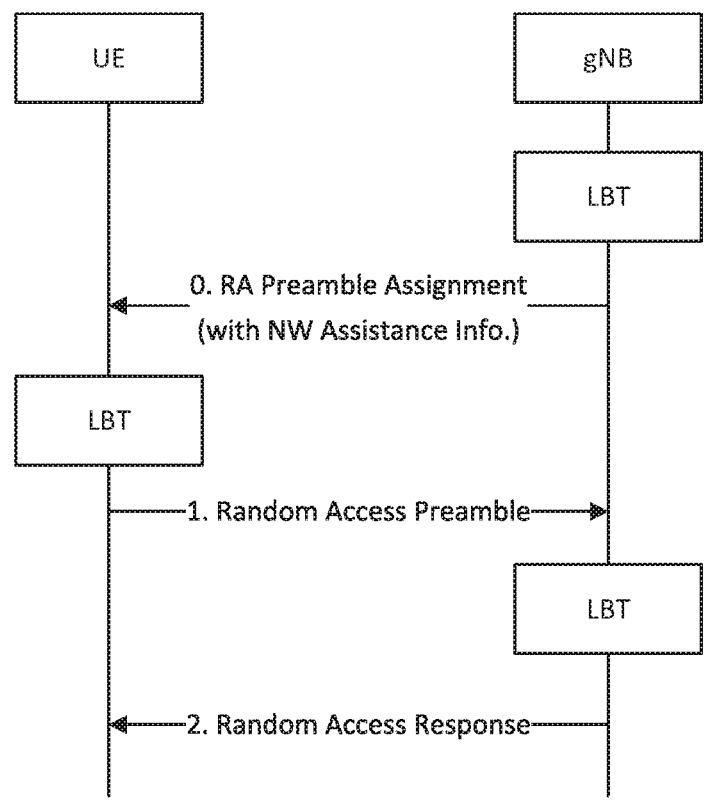
FIG. 14 is a call flow of an example NR-U contention free random access procedure with NW Assistance information signaled with RA preamble assignment.

FIG. 14 is an illustration of the signaling for an NR-U Contention Free Random Access Procedure with NW Assistance Information, where the NW Assistance Information and RA Preamble Assignment are signaled via a PDCCH Order. In this example, the transmission of the NW Assistance Information via the PDCCH order and the Random Access Preamble occur during the same COT, as shown in FIG. 9. The transmission of the Random Access Response may occur during the same COT as the transmission of the PDCCH order and the random access preamble or during a different COT.

Figure 15:
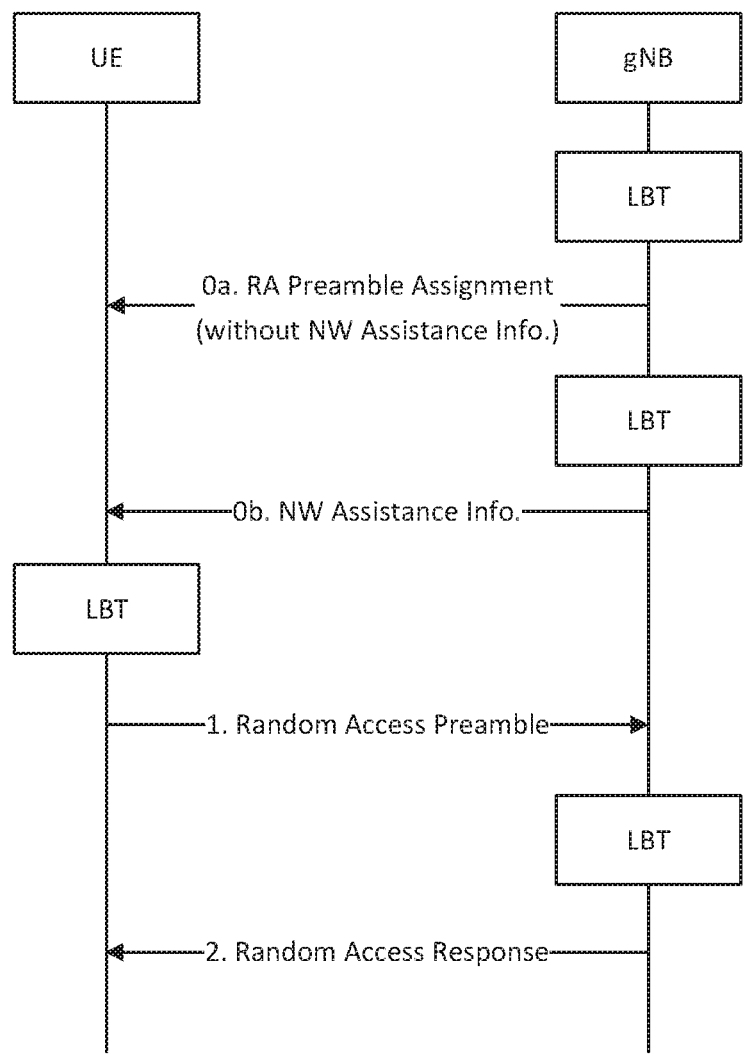
FIG. 15 is a call flow of an example NR-U contention free random access procedure with NW Assistance information signaled separately from RA preamble assignment.

FIG. 15 is an illustration of the signaling for an NR-U Contention Free Random Access Procedure with NW Assistance Information, where the RA Preamble Assignment is signaled via a PDCCH order, and the NW Assistance Information is signaled separately. In this example, the transmission of the NW Assistance Information, and the Random Access Preamble occur during the same COT, but the transmission of the RA Preamble Assignment via the PDCCH order occurs during a different COT as shown in FIG. 10. The transmission of the RAR may occur during the same COT as the transmission of the NW Assistance Information and the random access preamble or during a different COT.

Figure 16:
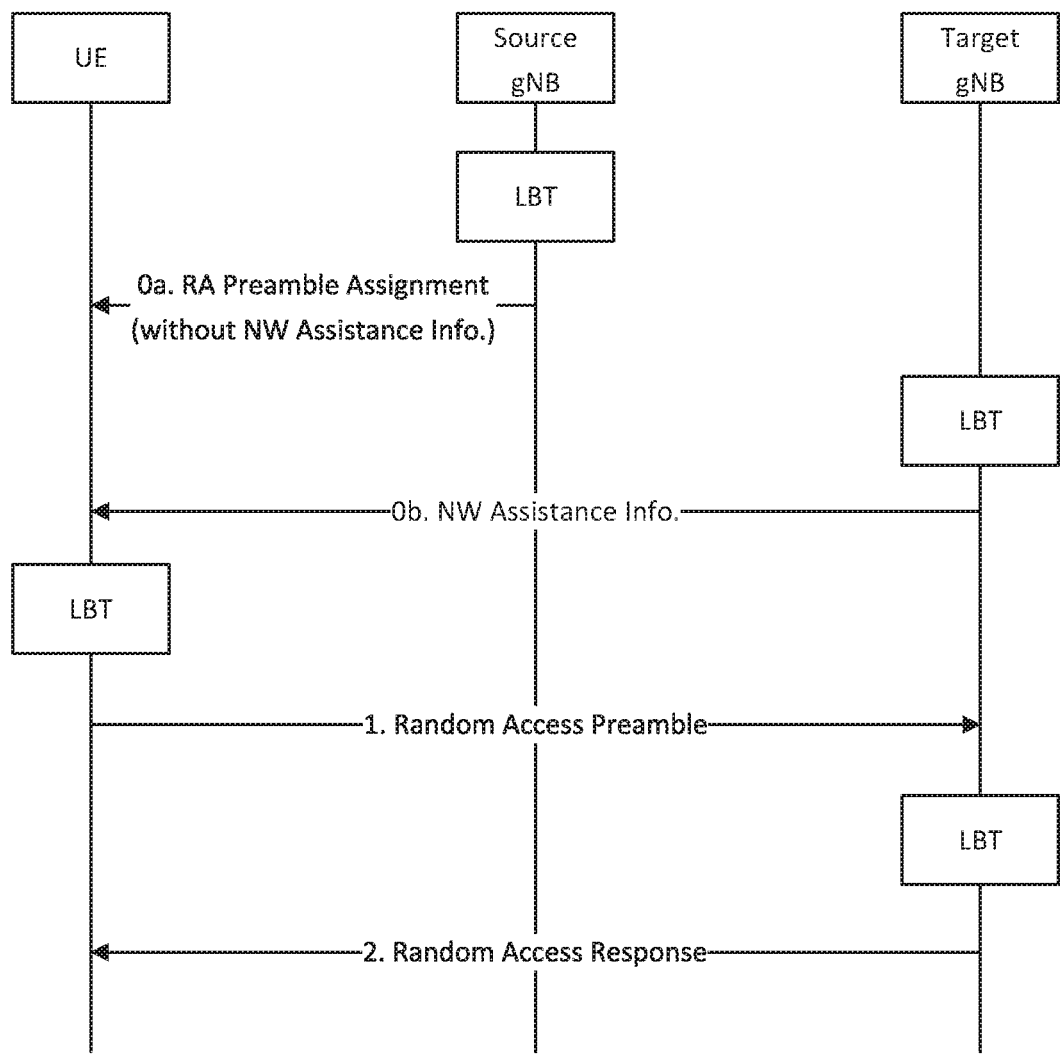
FIG. 16 is a call flow of an example NR-U contention free random access procedure with NW Assistance information signaled separately from RA preamble assignment (handover).

FIG. 16 is an illustration of the signaling for an NR-U Contention Free Random Access Procedure with NW Assistance Information, where the RA Preamble Assignment is signaled via a handover command, and the NW Assistance Information is signaled separately.

In this example, the transmission of the NW Assistance Information, and the Random Access Preamble occur during the same COT, but the transmission of the RA Preamble Assignment occurs during a different COT as shown in FIG. 11. The transmission of the RAR may occur during the same COT as the transmission of the NW Assistance Information and the Random Access Preamble or during a different COT.

NR-U Random Access Configurations

In NR, there are two frequency ranges, FR1 and FR2 as defined in Table 5. See 3GPP TS 38.101 User Equipment (UE) radio transmission and reception; (Release 15) V15.1.0.

PRACH in NR uses a subcarrier spacing of 1.25, 5, 15 and 30 kHz for FR1; 60 and 120 kHz are used for FR2

Figure 17:
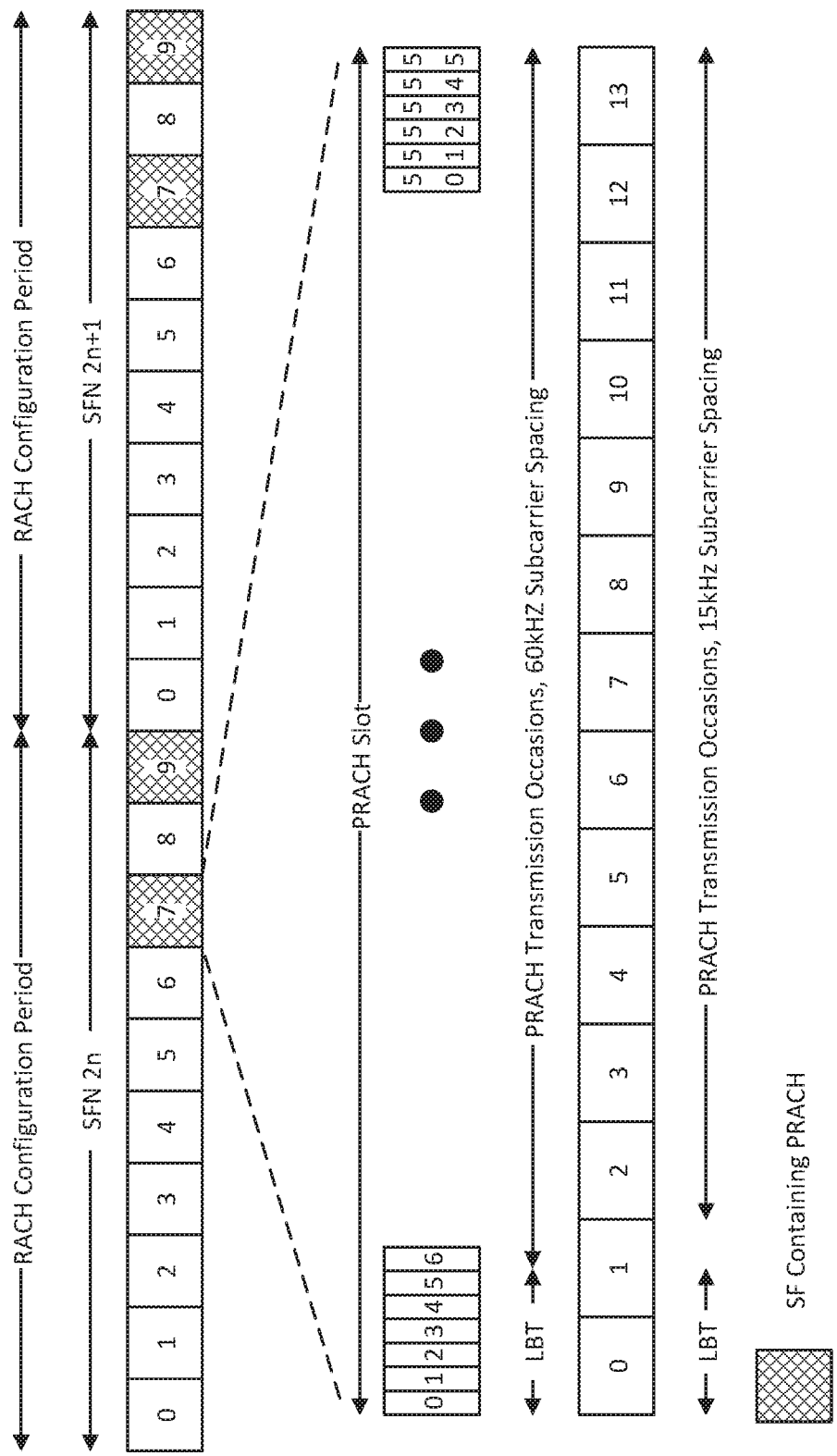
FIG. 17 is a timing diagram of an example overlay of LBT with PRACH slot.

Introducing 60 kHz and 120 kHz subcarrier spacing for NR-U in FR1 would be beneficial, since the time location and the time duration of LBT could be selected more flexibly, allowing the PRACH resources to be used more efficiently. As illustrated in FIG. 17, using 60 kHz subcarrier spacing for the preamble, the number of symbols available for PRACH transmission occasions could be large. In total there will be 56 symbols within each SF (1 ms). For illustrative purposes, suppose an LBT duration of 6 60 kHz OFDM symbols, then for example 50 of the 56 symbols; (89.3%) could be used for PRACH transmission occasions. In comparison to the 15 kHz subcarrier spacing case, where only 12 of the 14 symbols (85.7%), could be used for PRACH transmission occasions.

Supporting 60 and 120 kHz RACH configuration for NR-U in FR1 can be done by either using the existing RACH configuration tables as defined in 3GPP TS 38.211, Physical channels and modulation (Release 15), V15.1.0, using the same RACH-ConfigGeneric IE. See TS 38.331.

A more flexible RACH configuration for NR-U may be used by introducing separate RACH configuration tables for NR-U.

One example is shown in Table 6. In this example, the column 'Number of PRACH slots within a subframe' in the RACH configuration table defined for NR are removed. In Code Example 1, the information carried in that column is instead moved to the RACH-ConfigGeneric IE. That change give more flexible configurations for the PRACH transmission occasions.

A second example is shown in Table 7. In this example, the columns ('Starting Symbol' and 'Number of PRACH slots within a subframe') in the RACH configuration table defined for NR are removed. In Code Example 2, the information carried in those two columns are instead moved to the RACH-ConfigGeneric IE. Those changes give more flexible configurations for the PRACH transmission occasions.

Figure 18:
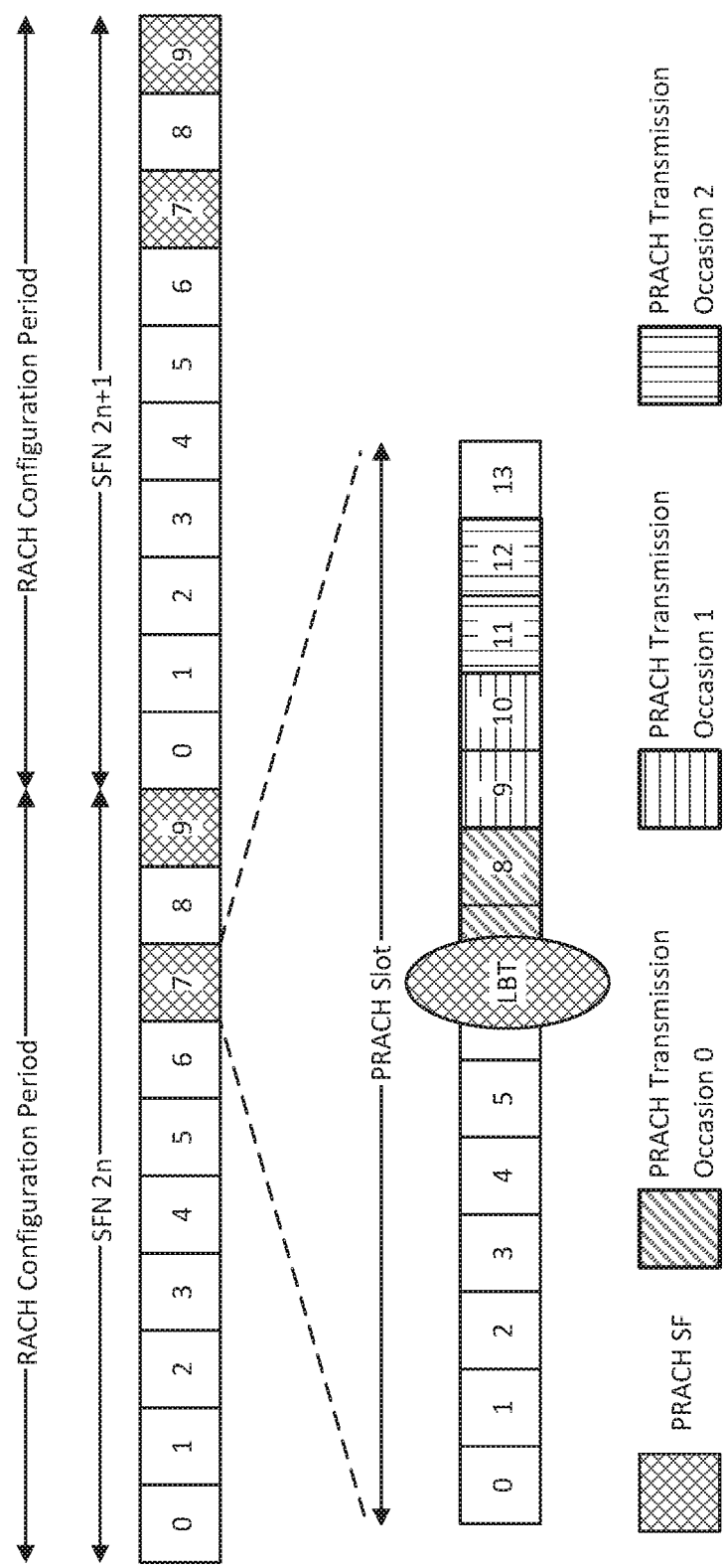
FIG. 18 is a timing diagram of an example collision between CCA period and PRACH transmission occasion.

In some configurations of the LBT (time duration and time location) and the configured PRACH transmission occasions a collision could occur. In that case the UE behavior could be to see the PRACH transmission occasions that collide with LBT as invalid. In the illustration in FIG. 18, PRACH transmission occasion 0 would be invalid. Only PRACH transmission occasion 1 and PRACH transmission occasion 2 are still valid.

Enhanced CCA

An enhanced CCA that makes use of transmission type identification code may be used. A transmission type identification code is a code or a combination of codes which uniquely identifies the UE serving cell or serving cell scheduler, the channel resource and the channel access type for e.g. contention based random access resource or non-contention based random access resources.

At the beginning of the PRACH transmission opportunity, each UE with intention to perform random access procedure, repeatedly transmit a transmission type identification signal for PRACH, over a short time interval period, before transmitting the actual PRACH preamble. Similarly, each UE with the intention to perform random access procedure, at the beginning of the PRACH transmission opportunity, monitor transmission type identification signals from other users of the channel, during a short time interval before transmitting a PRACH preamble for e.g. the same short time period as for the transmission of transmission type identification signal. The UE use its knowledge of the transmission type identification signal or its knowledge of the transmission duration and transmission occurrences in time within its serving cell, to make a decision on whether to defer or not defer to other users of the channel.

This enhanced CCA procedure may be summarized as below. Various variants of the procedure are further illustrated in FIG. 19, FIG. 20 and FIG. 21.

Assumption: At the beginning of the PRACH transmission opportunity, each UE with intention to perform random access procedure, repeatedly transmit the transmission type identification signal over a short time interval period, before transmitting the actual PRACH preamble.

Carrier Sensing

UE with the intention to transmit PRACH, perform carrier sensing during a short time interval preceding the actual transmission of the PRACH. During carrier sensing, the UE detects and decodes transmission type identification signal or code transmitted by other users of the channel. If the transmission type identification signal or code indicates contention based PRACH transmission or non-contention based PRACH transmission, the UE may not defer. However, the channel may be considered busy and held as busy for the relevant transmission duration, when the transmission identification detected indicates the UE may defer. The transmission duration may be the duration of the PRACH transmission occasion.

Energy Detection (ED)

The energy detection here refers to the ability of the UT to detect non-serving cell energy level (e.g. from the same PLMN, different PLMN or Wi-Fi) present on the channel, based on the noise floor, ambient energy, interference sources, and unidentifiable non-serving cell transmissions that may have been corrupted but and no longer be decoded. Predefined ED thresholds may be specified or configured into the UE for serving cell signals, non-serving cell signals (for e.g. of the same PLMN or different PLMN) or non-cellular signals or e.g. Wi-Fi signals. The UE uses the predefined ED thresholds for non-serving cell signals or for other non-cellular signals to determine if the detected energy level is high enough to consider the channel busy or idle.

If as part of carrier sensing function of CCA, the UE doesn't detect transmission identification signal or code that indicates contention based PRACH transmission or non-contention based PRACH transmission; and as part of the ED function of CCA, the UE detects non-serving energy level present on the channel higher than the non-serving cell ED threshold, the UE may consider the channel busy for the relevant duration and may defer.

The enhanced CCA may be network assisted or LTE autonomous.

For e.g. in a network assisted scheme, the assistance information may include one or more transmission type identification codes for, e.g., contention based random access resource or non-contention based random access resources. The assistance information may be configured into the UE through RRC common signaling (e.g., broadcast signaling or group cast signaling) or RRC dedicated signaling. The assistance information may also be configured to the UE through DCI signaling, where the UEs of the serving cell may be addressed using group PDCCH.

For UE autonomous based enhanced CCA method, the transmission type identification signal or code may be preconfigured into the UE or defined in the specification.

Figure 19:
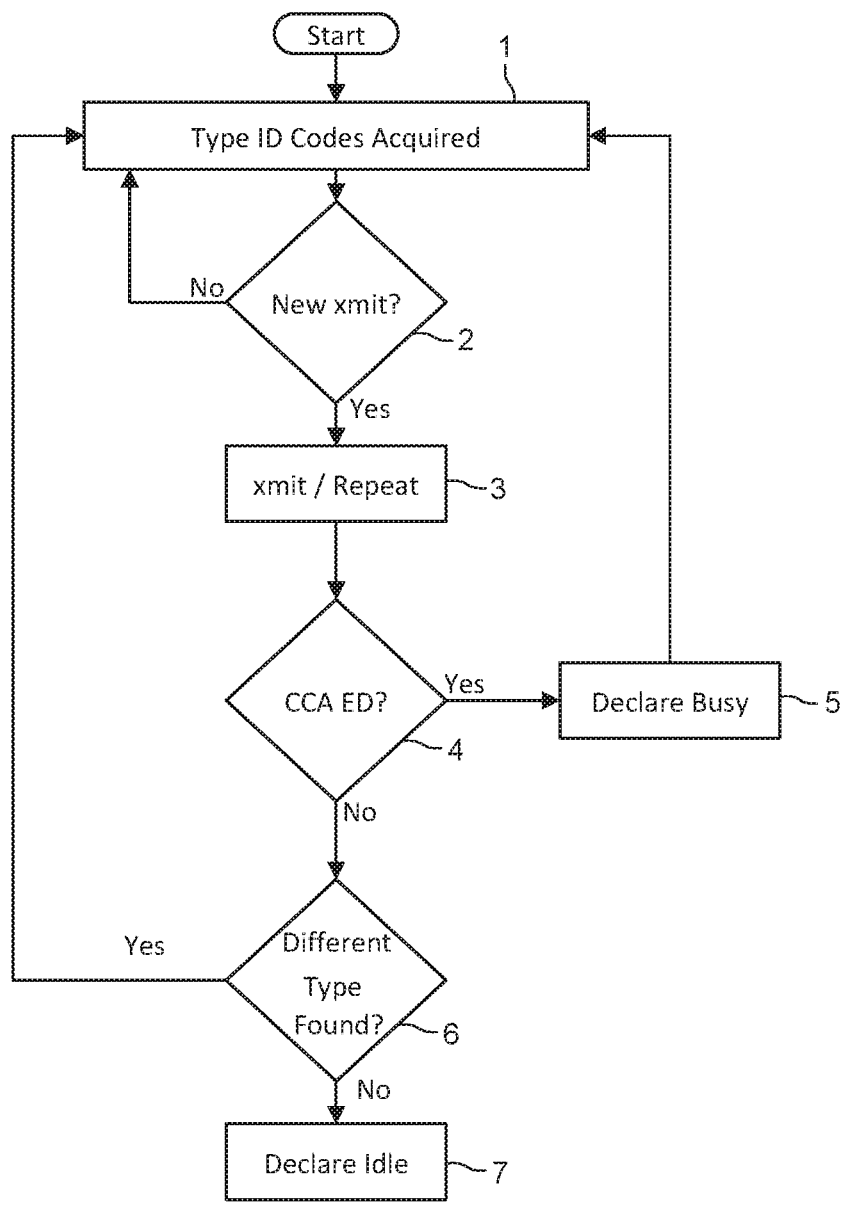
FIG. 19 is a flow diagram of an example UE autonomous enhanced CCA.

In the example of FIG. 19, in step 1 a UE contains predefined transmission type identification codes. The predefined transmission type identification codes may have been provided to the UE through pre-configuration, provisioning, or the specification, for example.

In step 2, the UE checks whether it is the beginning of a new transmission opportunity, e.g., a PRACH occasion in which and the UE intends to transmit. If not, the UE may perform other tasks before again checking for a new transmission opportunity.

If in step 2 this is the beginning of a new transmission opportunity, in step 3 the UE repeatedly transmits an identification type code.

Step 4 is Clear Channel Assessment (CCA) Energy Detection (ED). The UE listens on its channel to detect non-serving cell users with a transmission energy level above a non-serving cell ED threshold.

If a qualifying non-serving cell user is found in step 4, then in step 5, the UE declares the channel busy, defers transmission, and returns to step 1.

If no qualifying non-serving cell user is found in step 4, then in step 6, the UE performs CCA Carrier Sensing to detect and decode a different transmission type identification code from co-channel users of its serving cell. If a different transmission type identification code from co-channel users of the UE's serving cell is detected and decoded, the UE returns to step 1.

If in step 6 the UE does not detect and decode a different transmission type identification code, then in step 7 the UE determines that the channel is idle and proceeds with transmission, e.g., with a PRACH preamble transmission.

Figure 20:
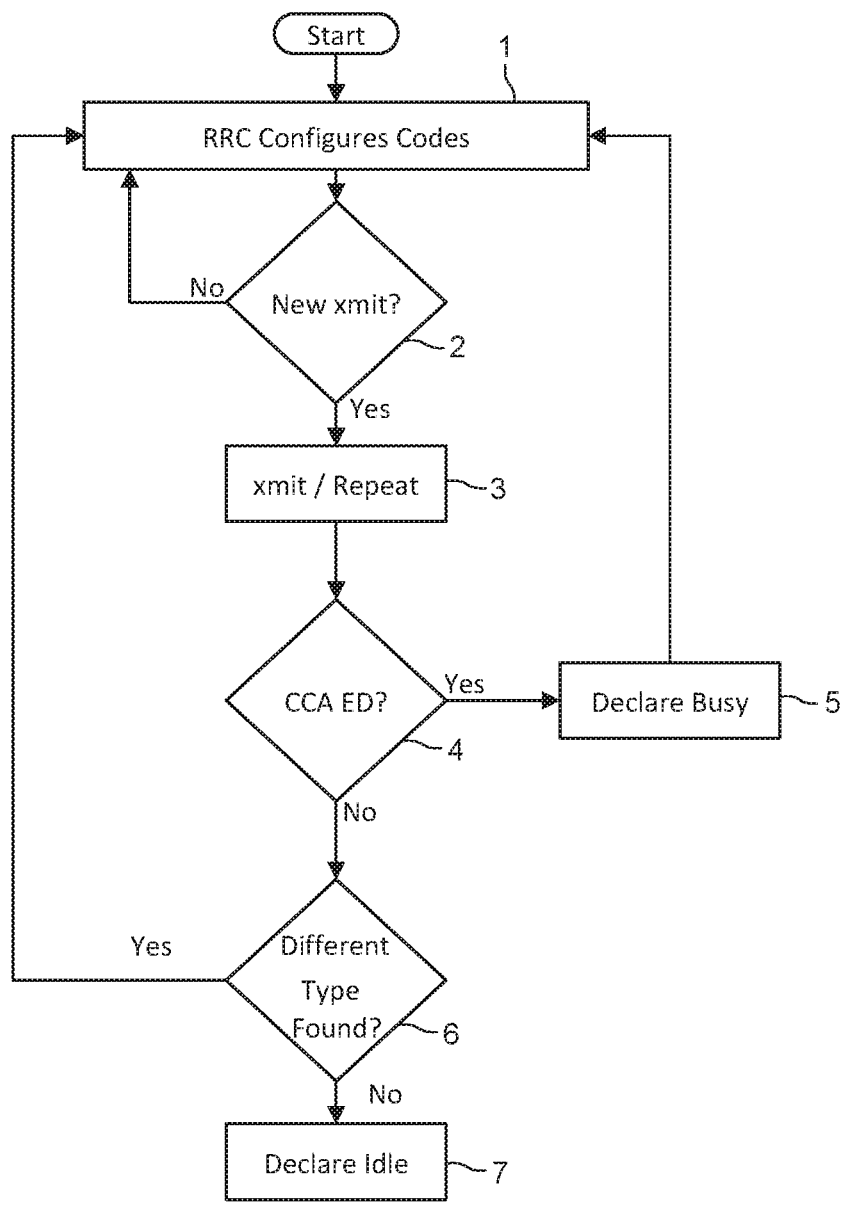
FIG. 20 is a flow diagram of an example network assisted enhanced CCA.

The operations in the example of FIG. 20 are similar to those in FIG. 19. In the example of FIG. 20, however, in step 1 the RRC configures the UE with one or more transmission type identification codes. The operations in steps 2-7 are analogous to those in the example of FIG. 19.

Figure 21:
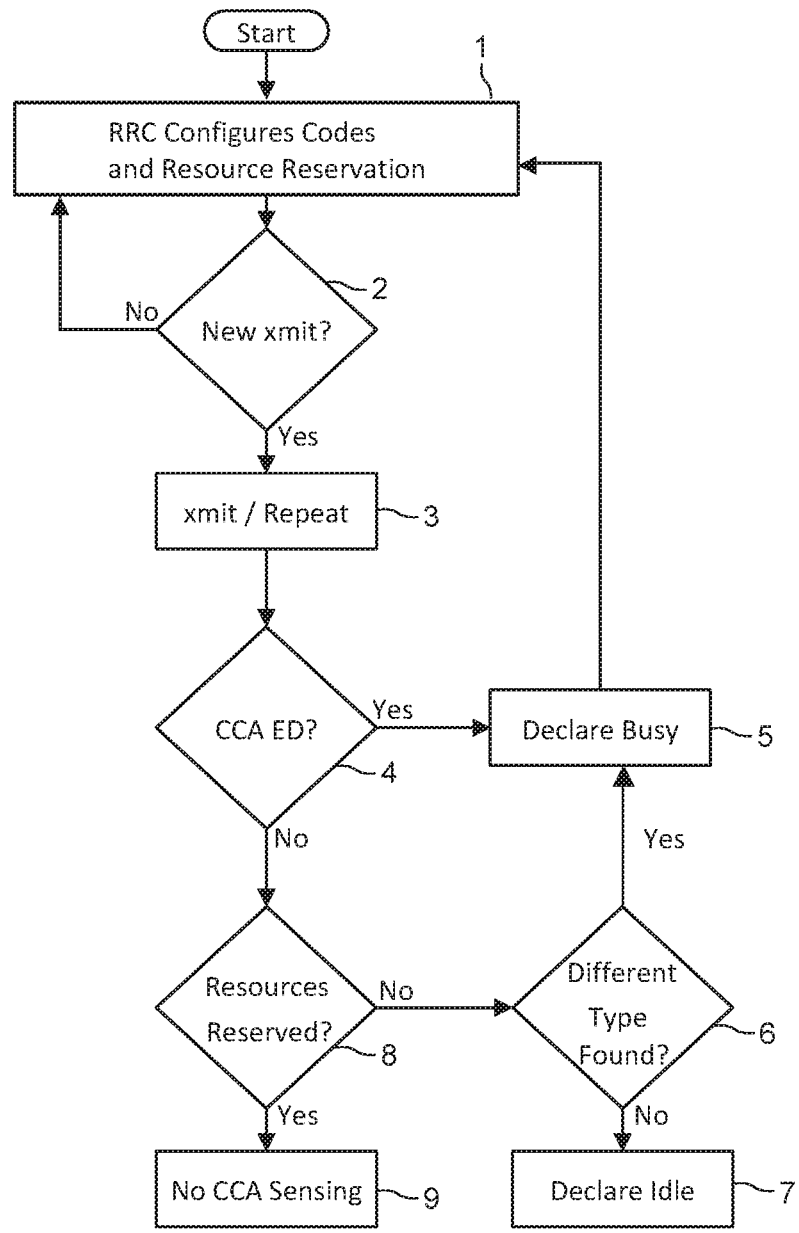
FIG. 21 is a flow diagram of an example another variant of network assisted enhanced CCA.

In the example of FIG. 21, in step 1 the RRC configures the UE with one or more transmission type identification codes and a serving cell future resource reservation.

In step 2 of FIG. 21, the UE checks whether it is the beginning of a new transmission opportunity, e.g., a PRACH occasion in which and the UE intends to transmit. If not, the UE may perform other tasks before again checking for a new transmission opportunity.

If in step 2 this is the beginning of a new transmission opportunity, in step 3 the UE repeatedly transmits an identification type code.

Step 4 is Clear Channel Assessment (CCA) Energy Detection (ED). The UE listens on its channel to detect non-serving cell users with a transmission energy level above a non-serving cell ED threshold.

If a qualifying non-serving cell user is found in step 4, then in step 5, the UE declares the channel busy, defers transmission, and returns to step 1.

If no qualifying non-serving cell user is found in step 4, then in step 8 the UE checks whether there are co-channel users of the serving cell transmitting during the period.

If in step 8 there are no co-channel users of the serving cell transmitting during the period, then in step 9 the UE declares the channel as idle and proceeds with a transmission, e.g., with a PRACH preamble transmission.

If in step 8 there are co-channel users of the serving cell transmitting during the period, then in step 6 the, the UE performs CCA Carrier Sensing to detect and decode a different transmission type identification code from co-channel users of its serving cell. If in step 6 no different transmission type identification code from co-channel users of the UE's serving cell is detected and decoded, the UE determines that the channel is idle, and the UE proceeds with a transmission, e.g., with a PRACH preamble transmission. Otherwise the UE declares the channel busy and returns to Step 1.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LIE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 22:
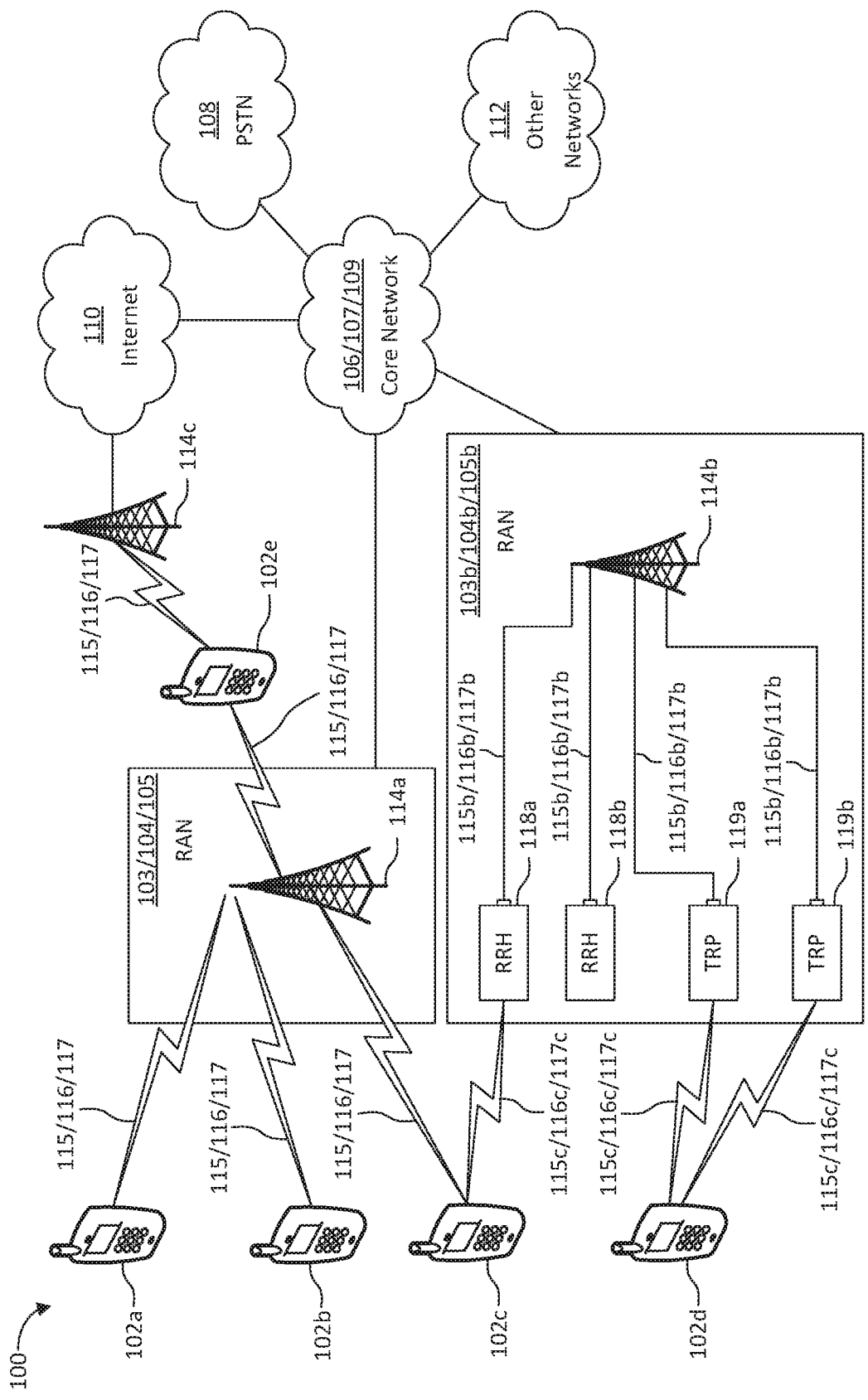
FIG. 22 illustrates one embodiment of an example communications system in which the methods and apparatuses described and claimed herein may be embodied.

FIG. 22 illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102h, 102c, 102d, 102e is depicted in FIGS. 22-26 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UNITS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1X, CDMA2000 EV-DO, interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 22 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 22, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over Internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 22, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 1102a, 102b, 102c, 102d, and 102e may include multiple transceivers for communicating with different wireless networks over different wireless links. For example, the WTRU 102e shown in FIG. 22 may be configured to communicate with the base station 114a, which may employ a cellular-based radio technology, and with the base station 114c, which may employ an IEEE 802 radio technology.

Figure 23:
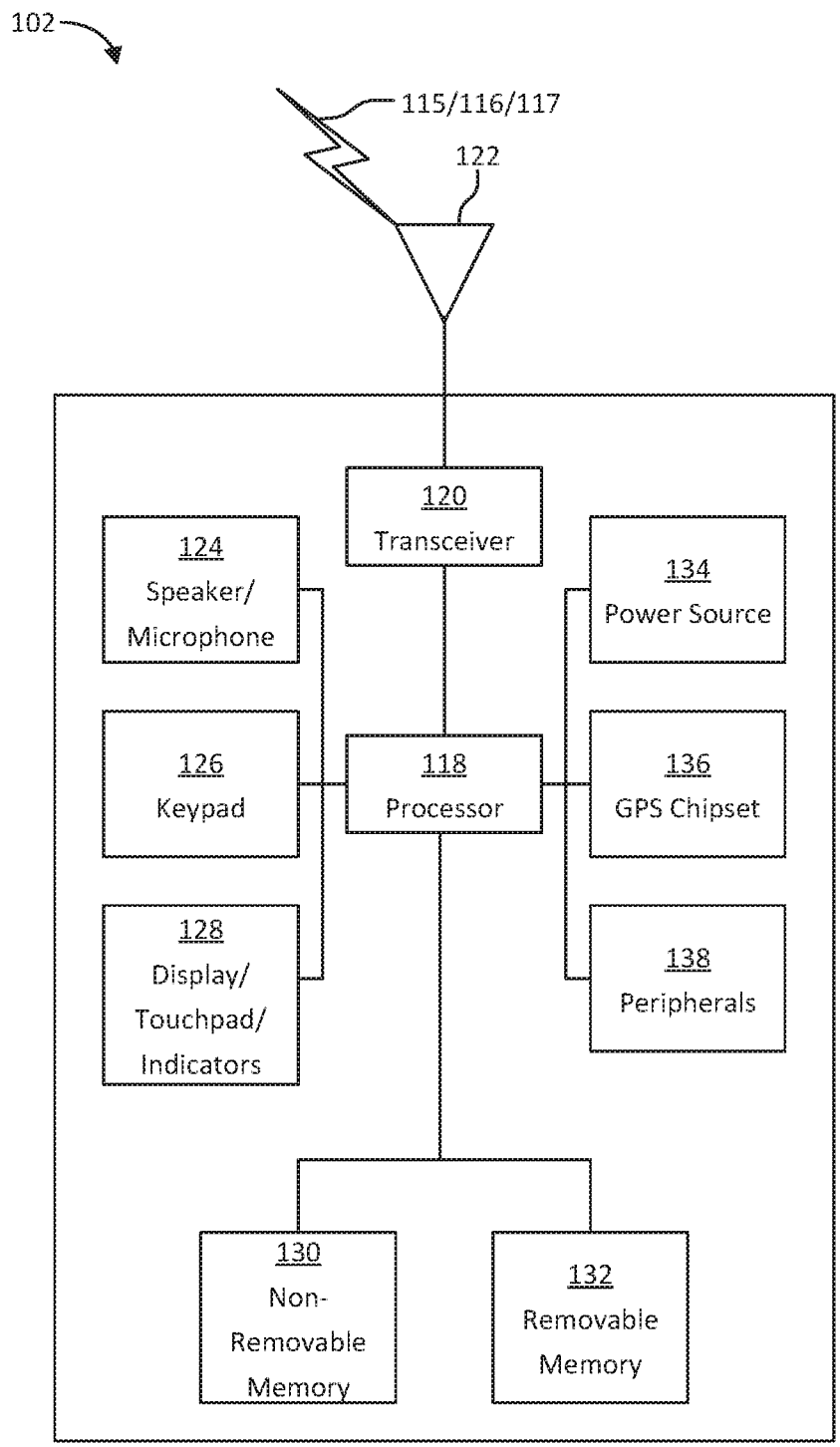
FIG. 23 is a block diagram of an example apparatus or device configured for wireless communications.

FIG. 23 is a block diagram of an example apparatus or device configured for wireless communications in accordance with the embodiments illustrated herein, such as for example, a WTRU 102. As shown in FIG. 23, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 23 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 23 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 23 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 24:
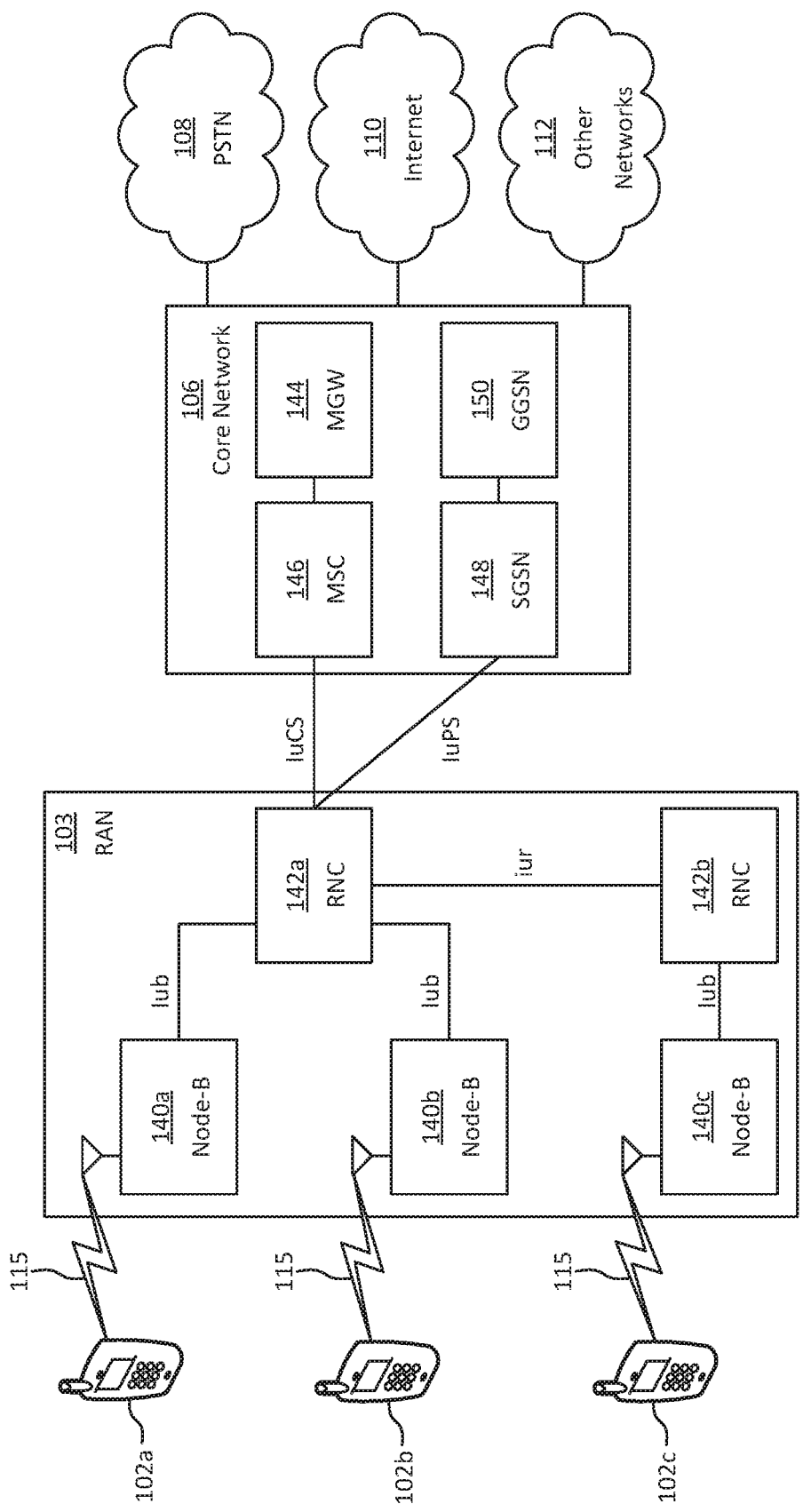
FIG. 24 is a system diagram of an example radio access network (RAN) and core network.

FIG. 24 is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 24, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 24, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Tub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 24 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 25:
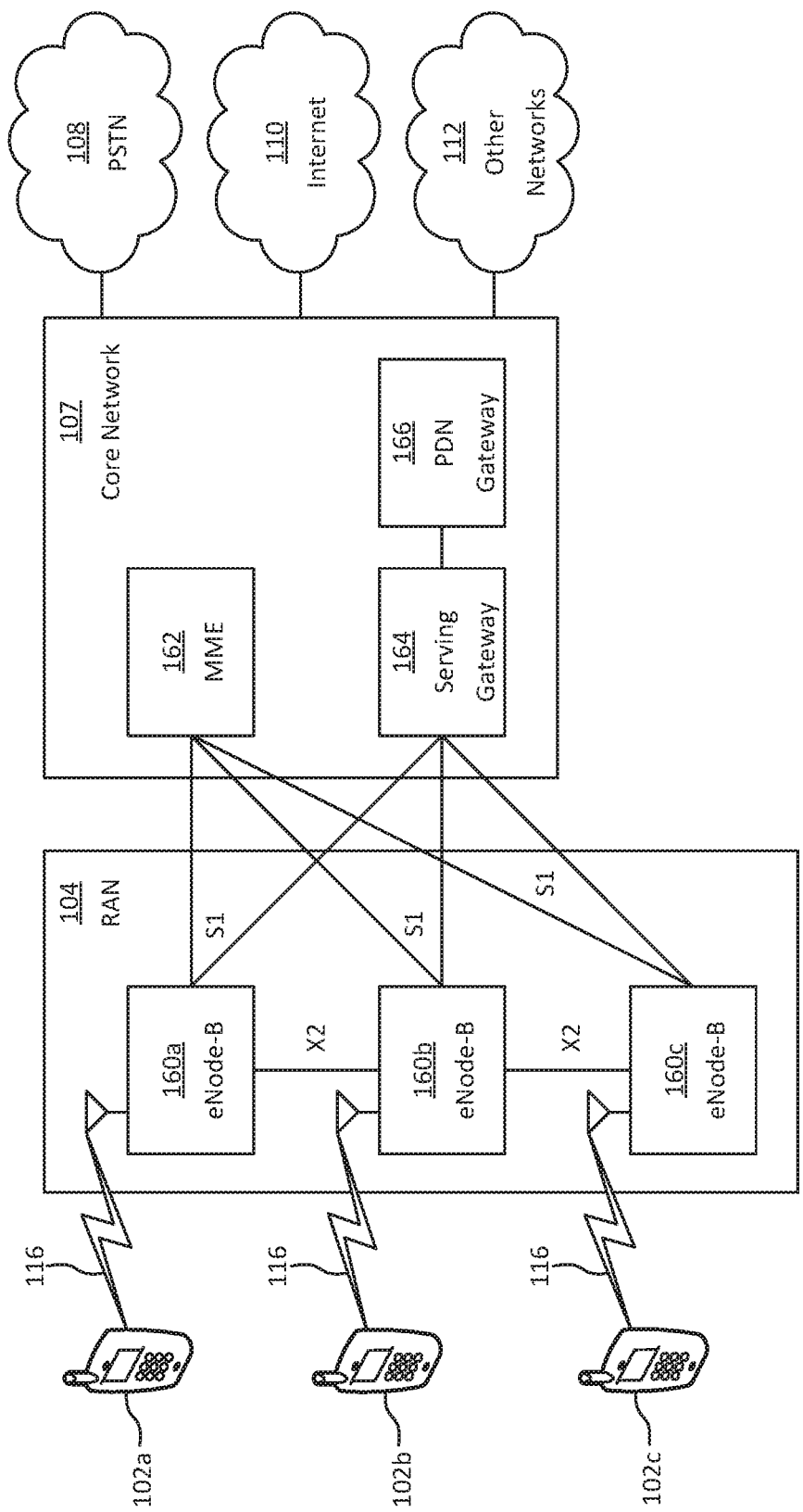
FIG. 25 is a system diagram of another example RAN and core network.

FIG. 25 is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 25, the eNode-Bs 160a, 160b, 160c may communicate with one another over an X2 interface.

The core network 107 shown in FIG. 25 may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs is 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 26:
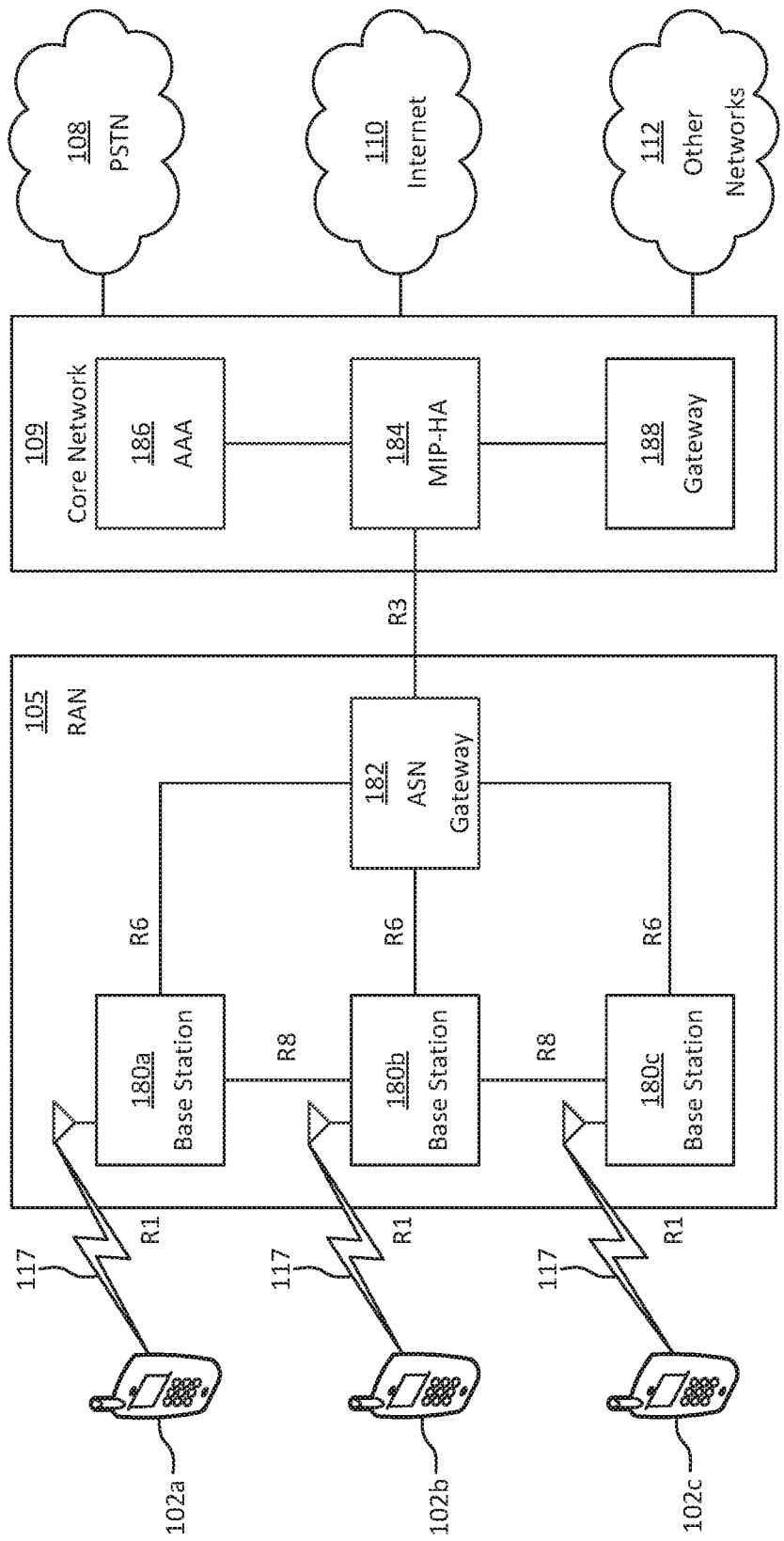
FIG. 26 is a system diagram of a further example RAN and core network.

FIG. 26 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 26, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 26, the RAN 105 may be connected to the core network 109. The communication link between the RAN 105 and the core network 109 may defined as an R3 reference point that includes protocols for facilitating data transfer and mobility management capabilities, for example. The core network 109 may include a mobile P home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices, The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 26, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 22, 24, 25, and 26 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 22-26 are provided by way of example only, and it is understood that the subject matter disclosed and claimed herein may be embodied or implemented in any similar communication system, whether presently defined or defined in the future.

Figure 27:
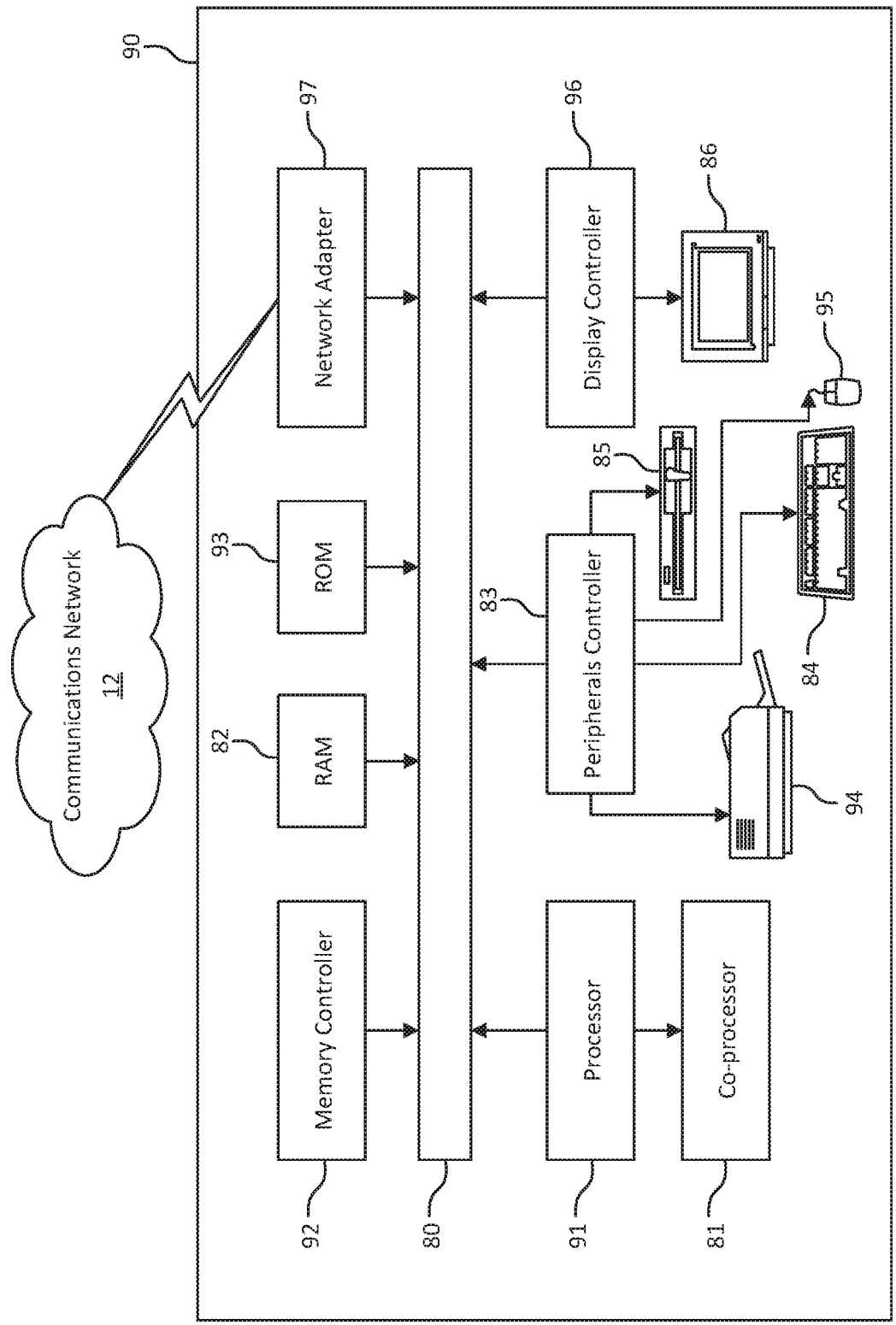
FIG. 27 is a block diagram of an exemplary computing system 90 in which one or more apparatuses of the communications networks illustrated in FIGS. 23, 25, 26, and 27 may be embodied.

FIG. 27 is a block diagram of an exemplary computing system 90 in which one or more apparatuses of the communications networks illustrated in FIGS. 22, 24, 25, and 26 may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated. Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 22-26, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

Appendix

TABLE 0

| Abbreviations | |
|---|---|
| ACK | Acknowledgement |
| ARQ | Automatic Repeat Request |
| BA | Bandwidth Adaption |
| BFR | Beam Failure Recovery |
| BWP | Bandwidth Part |
| CA | Carrier Aggregation |
| CE | Control Element |
| CBR | Channel Busy Ratio |
| CCA | Clear Channel Assessment |
| CDM | Code Division Multiplexing |
| CORESET | Control Resource Set |
| COT | Channel Occupancy Time |
| C-RNTI | Cell Radio-Network Temporary Identifier |
| CSI-RS | Channel State Information Reference Signal |
| CTS | Clear-to-Send |
| CW | Contention Window |
| DC | Duel Connectivity |
| DCI | Downlink Control Information |
| DL | Downlink |
| DTX | Discontinuous Transmission |
| DwPTS | Downlink Pilot Timeslot |
| ED | Energy Detection |
| eMBB | enhanced Mobile Broadband |
| FDM | Frequency Division Multiplexing |
| FR1 | Frequency Range 1 |
| FR2 | Frequency Range 2 |
| eNB | Evolved Node B |
| gNB | NR NodeB |
| HARQ | Hybrid ARQ |
| IE | Information Element |
| KPI | Key Performance Indicators |
| L1 | Layer 1 |
| L2 | Layer 2 |
| L3 | Layer 3 |
| LAA | License Assisted Access |
| LBT | Listen-Before-Talk |

TABLE 0-continued

| Abbreviations | |
|---|---|
| LTE | Long Term Evolution |
| MAC | Medium Access Control |
| MaxCL | Maximum Coupling Loss |
| MCG | Master Cell Group |
| MIMO | Multiple-Input and Multiple-Output |
| Msg1 | First Message of random access procedure |
| Msg3 | Third Message of random access procedure |
| MTC | Machine-Type Communications |
| mMTC | Massive Machine Type Communication |
| NA-RNTI | Network Assistance Radio Network Temporary Identifier |
| NR | New Radio |
| NR-U | NR Unlicensed |
| NW | Network |
| OFDM | Orthogonal Frequency Division Multiplexing |
| PCell | Primary Cell |
| PDCCH | Physical Downlink Control Channel |
| PHY | Physical Layer |
| PLAIN | Public Land Mobile Network |
| PRACH | Physical Random Access Channel |
| PSCell | Primary Secondary Cell |
| pTAG | Primary Timing Advance Group |
| PUCCH | Physical Uplink Control Channel |
| PUSCH | Physical Uplink Shared Channel |
| QoS | Quality of Service |
| RACK | Random Access Channel |
| RAN | Radio Access Network |
| RAP | Random Access Preamble |
| RAR | Random Access Response |
| RA-RNTI | Random Access Radio Network Temporary Identifier |
| RAT | Radio Access Technology |
| RO | RACH Occasion |
| RRC | Radio Resource Control |
| RSRP | Reference Signal Received Power |
| RTS | Request-to-Send |
| RX | Receive |
| SA | Standalone |
| SCell | Secondary Cell |
| SCG | Secondary Cell Group |
| SDU | Service Data Unit |
| SF | Subframe |
| SI | System Information |
| SpCell | Special Cell |
| SR | Scheduling Request |
| SRS | Sounding Reference Signal |
| SS | Synchronization Signal |
| SSB | SS Block |
| sTAG | Secondary Timing Advance Group |
| SUL | Supplementary Uplink |
| TAG | Timing Advance Group |
| TDD | Time Division Multiplexing |
| TRP | Transmission and Reception Point |
| TX | Transmit |
| UE | User Equipment |
| UL | Uplink |
| URLLC | Ultra-Reliable and Low Latency Communications |

TABLE 1

| KPIs for eMBB, URLLC and mMTC Devices | | | |
|---|---|---|---|
| Device | KPI | Description | Requirement |
| eMBB | Peak data rate | Peak data rate is the highest theoretical data rate which is the received data bits assuming error-free conditions assignable to a single mobile station, when all assignable radio resources for the corresponding link direction are utilized (e.g., excluding radio resources that are used for physical layer synchronization, reference signals or pilots, guard bands and guard times). | 20 Gbps for downlink and 10 Gbps for uplink |
| | Mobility interruption time | Mobility interruption time means the shortest time duration supported by the system during which a user terminal cannot exchange user plane packets with any base station during transitions. | 0 ms for intra-system mobility |
| | Data Plane | For eMBB value, the evaluation needs to consider all typical delays | 4 ms for UL, |

TABLE 1-continued

KPIs for eMBB, URLLC and mMTC Devices

| Device | KPI | Description | Requirement |
|---|---|---|---|
| URLLC | Latency | associated with the transfer of the data packets in an efficient way (e.g. applicable procedural delay when resources are not pre-allocated, averaged HARQ retransmission delay, impacts of network architecture). | and 4 ms for DL |
| | Control Plane Latency | Control plane latency refers to the time to move from a battery efficient state (e.g., IDLE) to start of continuous data transfer (e.g., ACTIVE). | 10 ms |
| | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes within 1 ms, which is the time it takes to deliver a small data packet from the radio protocol layer 2/3 SDU ingress point to the radio protocol layer 2/3 SDU point of the radio interface, at a certain channel quality (e.g., coverage-edge). | $1-10^{-5}$ within 1 ms |
| mMTC | Coverage | MaxCL in uplink and downlink between device and Base Station site (antenna connector(s)) for a data rate of 160 bps, where the data rate is observed at the egress/ingress point of the radio protocol stack in uplink and downlink. | 164 dB |
| | UE Battery Life | UE battery life can be evaluated by the battery life of the UE without recharge. For mMTC, UE battery life in extreme coverage may be based on the activity of mobile originated data transfer consisting of 200 bytes UL per day followed by 20 bytes DL from MaxCL of 164 dB, assuming a stored energy capacity of 5 Wh. | 15 years |
| | Connection Density | Connection density refers to total number of devices fulfilling specific Quality of Service (QoS) per unit area (per km$^2$). QoS definition should take into account the amount of data or access request generated within a time t_gen that can be sent or received within a given time, t_sendrx, with x % probability. | $10^6$ devices/km$^2$ |

TABLE 2

Exemplary DCI Format Used to Signal NW Assistance Information

| Field Name | # Bits | Comment |
|---|---|---|
| Channel Access Type | 2 | Indicates the channels accessing type, such as "00" for Type1, "01" for Type 2, "10" for Type 3, and "11" for Type 4. |
| Channel Access Priority Class | 2 | Optional, indicates the priority for channel accessing. |
| Reserved bits | 1 | |

TABLE 3

NR-U PDCCH Order

| Field Name | # Bits |
|---|---|
| Preamble Index | 6 |
| PRACH Mask Index | 4 |
| Channel Access Type | 2 |

TABLE 4

NR-U RAR UL Grant Field Description

| Field | Number of Bits |
|---|---|
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |
| Channel Access Type | 2 |
| Reserved bits | 1 |

TABLE 5

Definition of Frequency Ranges

| Frequency range designation | Corresponding frequency range |
|---|---|
| FR1 | 450 MHz-6000 MHz |
| FR2 | 24250 MHz-52600 MHz |

TABLE 6

NR-U Random Access Configurations for FR1 and Unpaired Spectrum

| PRACH Configuration Index | Preamble format | Subframe number | Starting symbol | $N_{dur}^{RA}$, PRACH duration |
|---|---|---|---|---|
| 1 | A1 | 9 | 0 | 2 |
| 2 | A1 | 8, 9 | 7 | 2 |
| 3 | A1 | 4, 9 | 0 | 2 |

TABLE 6-continued

NR-U Random Access Configurations for FR1 and Unpaired Spectrum

| PRACH Configuration Index | Preamble format | Subframe number | Starting symbol | $N_{dur}^{RA}$, PRACH duration |
|---|---|---|---|---|
| 4 | A1 | 7, 9 | 7 | 2 |
| 5 | A1 | 3, 4, 8, 9 | 0 | 2 |
| 6 | A2 | 9 | 0 | 4 |
| 7 | A2 | 8, 9 | 0 | 4 |
| 8 | A2 | 4, 9 | 5 | 4 |
| 9 | A2 | 7, 9 | 5 | 4 |
| 10 | A2 | 3, 4, 8, 9 | 5 | 4 |
| 11 | A3 | 9 | 0 | 6 |
| 12 | A3 | 8, 9 | 2 | 6 |
| 13 | A3 | 4, 9 | 7 | 6 |
| 14 | A3 | 7, 9 | 0 | 6 |
| 15 | A3 | 3, 4, 8, 9 | 2 | 6 |
| 16 | C0 | 9 | 0 | 2 |
| 17 | C0 | 8, 9 | 8 | 2 |
| 18 | C0 | 4, 9 | 0 | 2 |
| 19 | C0 | 7, 9 | 8 | 2 |
| 20 | C0 | 3, 4, 8, 9 | 0 | 2 |
| 21 | C2 | 9 | 0 | 6 |
| 22 | C2 | 8, 9 | 2 | 6 |
| 23 | C2 | 4, 9 | 7 | 6 |
| 34 | C2 | 7, 9 | 0 | 6 |
| 25 | C2 | 3, 4, 8, 9 | 7 | 6 |
| 26-63 | Reserved | | | |

TABLE 7

NR-U Random Access Configurations for FR1 and Unpaired Spectrum

| PRACH Configuration Index | Preamble format | Subframe number | $N_{dur}^{RA}$, PRACH duration |
|---|---|---|---|
| 1 | A1 | 9 | 2 |
| 2 | A1 | 8, 9 | 2 |
| 3 | A1 | 4, 9 | 2 |
| 4 | A1 | 7, 9 | 2 |
| 5 | A1 | 3, 4, 8, 9 | 2 |
| 6 | A2 | 9 | 4 |
| 7 | A2 | 8, 9 | 4 |
| 8 | A2 | 4, 9 | 4 |
| 9 | A2 | 7, 9 | 4 |
| 10 | A2 | 3, 4, 8, 9 | 4 |
| 11 | A3 | 9 | 6 |
| 12 | A3 | 8, 9 | 6 |
| 13 | A3 | 4, 9 | 6 |
| 14 | A3 | 7, 9 | 6 |
| 15 | A3 | 3, 4, 8, 9 | 6 |
| 16 | C0 | 9 | 2 |
| 17 | C0 | 8, 9 | 2 |
| 18 | C0 | 4, 9 | 2 |
| 19 | C0 | 7, 9 | 2 |
| 20 | C0 | 3, 4, 8, 9 | 2 |
| 21 | C2 | 9 | 6 |
| 22 | C2 | 8, 9 | 6 |
| 23 | C2 | 4, 9 | 6 |
| 34 | C2 | 7, 9 | 6 |
| 25 | C2 | 3, 4, 8, 9 | 6 |
| 26-31 | reserved | | |

```
RACH-ConfigGeneric ::= SEQUENCE {
    prach-ConfigurationIndex      INTEGER (0..63),
    msg1_NumberOfPrachSlots       ENUMERATED {one, two, three, four}
    msg1-FDM                      ENUMERATED {one, two, four, eight},
    msg1-FrequencyStart           INTEGER (0..maxNrofPhysicalResourceBlocks-1),
    zeroCorrelationZoneConfig     INTEGER(0..15),
    preambleReceivedTargetPower   INTEGER (-200..-74),
    preambleTransMax              ENUMERATED {n3, n4 , n5, n6, n7, n8, n10, n20, n50, n100, n200},
    powerRampingStep              ENUMERATED {dB0, dB2, dB4, dB6},
    ra-ResponseWindow             ENUMERATED {sl1, sl2, sl4, sl8, sl10, sl20, sl40, sl80}
}
```

```
RACH-ConfigGeneric ::= SEQUENCE {
    prach-ConfigurationIndex      INTEGER (0..31) ,
    mSg1_StartingSymbol           ENUMERATED {zero ... nine}
    msg1_NumberOfPrachSlots       ENUMERATED {one, two, three, four}
    msg1-FDM                      ENUMERATED {one, two, four, eight},
    msg1-FrequencyStart           INTEGER (0..maxNrofPhysicalResourceBlocks-1),
    zeroCorrelationZoneConfig     INTEGER (0..15) ,
    preambleReceivedTargetPower   INTEGER (-200..74) ,
    preambleTransMax              ENUMERATED {n3, n4, n5, n6, n7, n8, n10, n20, n50, n100, n200},
    powerRampingStep              ENUMERATED {dB0, dB2, dB4, dB6},
    ra-ResponseWindow             ENUMERATED {sl1, sl2, sl4, sl8, sl10, sl20, sl40, sl80}
}
```

We claim:

1. An apparatus, comprising a processor, a memory, and communication circuitry, the apparatus being connected to a network via the communication circuitry, the apparatus further comprising computer-executable instructions stored in the memory of the apparatus which, when executed by the processor of the apparatus, cause the apparatus to perform operations comprising:
perform a first type of uplink (UL) channel access procedure for a Random Access Channel (RACH) procedure;
send a first UL transmission for the RACH procedure;
receive a random access response (RAR) comprising network assistance information including channel access information;
determine, based on the channel access information, a second type of UL channel access procedure for the RACH procedure;
perform the second type of UL channel access procedure; and
send a second UL transmission for the RACH procedure.

2. The apparatus of claim 1, wherein: the second type of uplink UL channel access procedure includes a listen-before-talk (LBT) procedure.

3. The apparatus of claim 2, wherein the channel access information indicates the LBT procedure with random backoff.

4. The apparatus of claim 1, wherein the channel access information indicates use of a default configuration.

5. The apparatus of claim 2, wherein the channel access information indicates the LBT procedure without random backoff.

6. The apparatus of claim 1, wherein the channel access information indicates the apparatus may perform the second UL transmission without performing a LBT procedure.

7. The apparatus of claim 1, wherein the channel access information indicates use of an alternate configuration.

8. The apparatus of claim 1, wherein the second type of UL channel access procedure is one of a set of more than two defined channel access types.

9. A method for uplink channel access comprising:
performing a first type of uplink (UL) channel access procedure for a Random Access Channel (RACH procedure;
sending a first UL transmission for the RACH procedure;
receiving a random access response (RAR) comprising network assistance information including channel access information;
determining, based on the channel access information, a second type of UL channel access procedure for the RACH procedure;
performing the second type of UL channel access procedure; and
sending a second UL transmission for the RACH procedure.

10. The method of claim 9, wherein the second type of uplink UL channel access procedure includes a listen-before-talk (LBT) procedure.

11. The method of claim 10, wherein the channel access information indicates the LBT procedure with random backoff.

12. The method of claim 10, wherein the channel access information indicates the LBT procedure without random backoff.

13. The method of claim 9, wherein the channel access information indicates use of a default configuration.

14. The method of claim 9, wherein the channel access information indicates use of an alternate configuration.

15. The method of claim 9, wherein the channel access information indicates performance of the second UL transmission without performing LBT.

16. The method of claim 9, wherein the second type of UL channel access procedure is one of a set of more than two defined channel access types.

\* \* \* \* \*